(12) United States Patent
Fujisawa

(10) Patent No.: US 6,229,781 B1
(45) Date of Patent: May 8, 2001

(54) DISK APPARATUS FOR PROVIDING AN INCREASED RELIABILITY OF DISK HOLDING AND CLAMPING OPERATIONS WHEN INSTALLED IN ITS VERTICAL POSITION

(75) Inventor: Shinichi Fujisawa, Akiruno (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/116,386

(22) Filed: Jul. 16, 1998

(30) Foreign Application Priority Data

Jul. 18, 1997 (JP) .................................................. 9-194223

(51) Int. Cl.⁷ .................................................. G11B 33/02
(52) U.S. Cl. .................................................. 369/77.1
(58) Field of Search .................................. 369/75.1, 75.2, 369/77.1, 77.2

(56) References Cited

U.S. PATENT DOCUMENTS 5,608,705 * 3/1997 Tanaka .................................. 369/77.1

* cited by examiner

Primary Examiner—George J. Letscher
(74) Attorney, Agent, or Firm—Anderson, Kill & Olick, P.C.

(57) ABSTRACT

A disk apparatus includes a chassis and a tray supported on the chassis, the tray being provided to be movable between a disk-change position and a disk-loaded position. A disk holder holds a disk on the tray at a given position. A movable base supports a turntable thereon, the turntable being provided to support and rotate the disk on the turntable, the movable base being provided to be vertically rotatable between a lowered position and a lifted position. A clamper clamps the disk between the turntable and the clamper. A movable base drive unit actuates the movable base to the lifted position by a driving force of a motor when the tray is moved to the disk-loaded position, such that the disk is clamped between the clamper and the turntable. The movable base drive unit includes a slider which actuates the movable base to the lifted position and presses the disk holder in a radial direction of the disk to separate the disk holder from the disk at the same time as the actuation of the movable base.

11 Claims, 21 Drawing Sheets

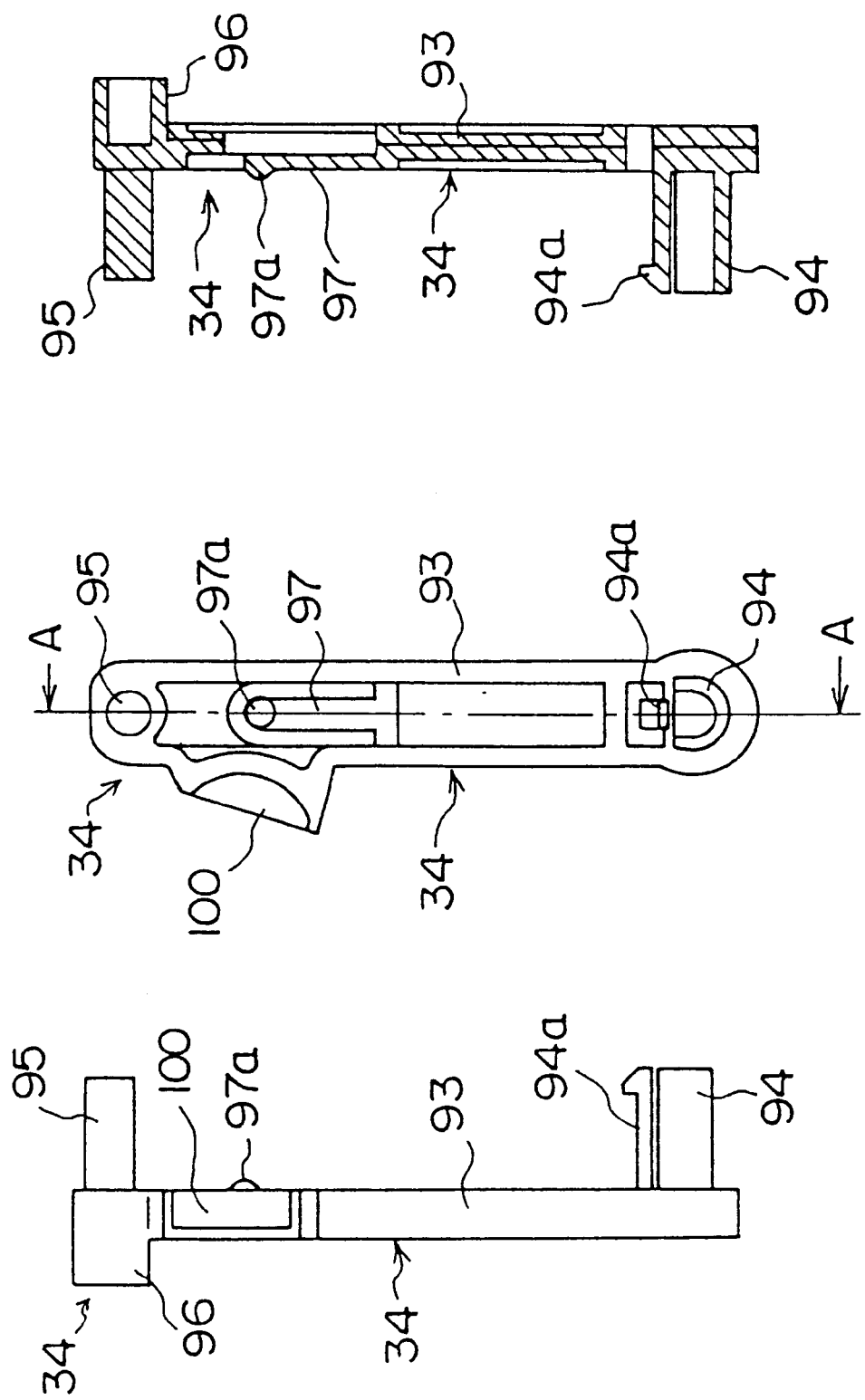

DISK APPARATUS FOR PROVIDING AN INCREASED RELIABILITY OF DISK HOLDING AND CLAMPING OPERATIONS WHEN INSTALLED IN ITS VERTICAL POSITION

BACKGROUND OF THE INVENTION (1) Field of the Invention

The present invention relates to a disk apparatus having a disk loading mechanism in which a recording medium is held on a tray and the tray is movably supported such that the tray is movable between a disk-change position and a disk-loaded position.

(2) Description of the Related Art

There is known a CD-ROM drive in which a CD-ROM (compact disk read-only memory) is held on a tray and the tray is movably supported such that the tray is movable between a disk-change position and a disk-loaded position. In the CD-ROM drive, when the tray is moved to the disk-loaded position within the CD-ROM drive, a movable base having a turntable is moved up to clamp the CD-ROM on the tray, so that the CD-ROM is rotated on the turntable to read information from the CD-ROM.

FIG. 25 shows a conventional disk apparatus such as the above CD-ROM drive. As shown in FIG. 25, the conventional disk apparatus includes a tray 2, tray guide members 3, an optical pickup 4, a turntable 5, a movable base 6, and a chassis 10. A CD-ROM 1 (hereinafter called the disk 1) is placed on the tray 2. The tray 2 is guided by the tray guide members 3 when the tray 2 is inserted into or ejected from the chassis 10. The pickup 4 and the turntable 5 are supported on the movable base 6. The tray 2 is moved between a disk-change position and a disk-loaded position in one of an ejecting direction (indicated by the arrow A in FIG. 25) and an inserting direction (indicated by the arrow B in FIG. 25) by a tray moving mechanism 2a.

The movable base 6 is supported at its rear end by a leaf spring 7 and connected at its front end to a slider cam 8. The leaf spring 7 exerts an actuating force on the movable base 6 so as to lift the front end of the movable base 6. When the slider cam 8 slides in a lateral direction to release the front end of the movable base 6, the front end of the movable base 6 is lifted by the actuating force of the leaf spring 7, so that the disk 1 is clamped between the turntable 5 and a damper (not shown) by the movable base 6. In this condition, the disk 1 is rotated on the turntable 5 to read information from the disk 1.

In a case in which a disk apparatus is installed in its vertical position on a host computer, it is necessary that a disk holding member is provided to hold the disk 1 in the disk apparatus, installed in its vertical position, while preventing the disk 1 from loosely falling from the tray 2 or being inclined to the tray 2 before the disk 1 is held on the tray 2 at the disk-loaded position. As disclosed in Japanese Laid-Open Patent Application No. 8-77673, a disk apparatus including a disk holding member for holding a disk in such a case is known.

In the conventional disk apparatus of FIG. 25, a disk holding member 9 having a pair of holding parts 9a is provided on the tray 2. A pair of projections 10a are provided on the chassis 10 at positions corresponding to positions of the holding parts 9a to the chassis 10 when the tray 2 is moved to the disk-loaded position in the inserting direction B. The holding parts 9a are rotatably supported on the tray 2 by using an actuating force of a spring (not shown), and movable in a vertical direction perpendicular to the surface of the disk 1. During the movement of the tray 2 between the disk-change position and the disk-loaded position in one of the ejecting direction A and the inserting direction B, the holding parts 9a are placed in horizontal conditions near the tray 2 where the disk 1 is held on the tray 2 by the holding parts 9a.

When the tray 2 is moved in the inserting direction B and reaches a position immediately preceding the disk-loaded position, the holding parts 9a are vertically rotated away from the tray 2 by the contact of the holding parts 9a with the projections 10a on the chassis 10. In this condition, the disk 1 is released from the disk holding member 9. As the front end of the movable base 6 on which the turntable 5 is provided is lifted by the actuating force of the leaf spring 7, the disk 1 is clamped between the turntable 5 and the clamper by the movable base 6. Therefore, even in the case in which the conventional disk apparatus of FIG. 25 is installed in its vertical position, the disk 1 is rotated on the turntable 5 to read information from the disk 1.

As the turntable 5 is lifted by the upward movement of the movable base 6, the disk 1 which is released from the disk holding member 9 is clamped between the turntable 5 and the damper on the tray 2. In the case in which the conventional disk apparatus of FIG. 25 is installed in the vertical position, the disk 1 in its vertical position is loaded in the disk apparatus and clamped in the above-described manner.

In the conventional disk apparatus of FIG. 25, the disk 1 is released from the disk holding member 9 when the tray 2 reaches the position immediately preceding the disk-loaded position, and then the disk 1 is clamped between the turntable 5 and the damper when the turntable 5 is lifted with the upward movement of the movable base 6. That is, the releasing action of the disk holding member 9 to release the disk 1 is started before the tray 2 reaches the disk-loaded position. When the tray 2 reaches the disk-loaded position, the clamping action to clamp the disk 1 between the turntable 5 and the damper is not yet complete. Hence, in the case of the vertical-position installation for the conventional disk apparatus of FIG. 25, the disk 1 in the disk apparatus placed in its vertical position may be inclined to the tray 2 before the disk 1 is clamped. If the disk 1 is inclined to the tray 2 before the disk 1 is clamped, it is likely that the disk 1 be improperly clamped between the turntable 5 and the clamper.

Further, in the conventional disk apparatus of FIG. 25, the disk holding member 9 holds the disk 1 by using the actuating force of the spring in the direction perpendicular to the surface of the disk 1. In order to stably hold the disk 1 by the disk holding member 9, it is necessary that the actuating force of the spring is relatively large. Hence, it is necessary for the conventional disk apparatus of FIG. 25 to use the disk holding member 9 with a spring having a relatively large actuating force, which makes the disk holding member 9 bulky.

SUMMARY OF THE INVENTION

An object of the present invention is to provide an improved disk apparatus in which the above-described problems are eliminated.

Another object of the present invention is to provide a disk apparatus which provides a simple construction of a movable base drive unit for actuating a movable base so as to hold and clamp a disk on the movable base, and provides an increased reliability of the disk holding and clamping operations even when the disk apparatus is installed in its vertical position.

The above-mentioned objects of the present invention are achieved by a disk apparatus which comprises: a chassis; a tray which is supported on the chassis and is provided to be movable between a disk-change position and a disk-loaded position; a disk holder which holds a disk on the tray at a given position; a movable base on which a turntable is supported, the turntable provided to support and rotate the disk on the turntable, the movable base provided to be vertically rotatable between a lowered position and a lifted position; a damper which clamps the disk between the turntable and the clamper; and a movable base drive unit which actuates the movable base to the lifted position by a driving force of a motor when the tray is moved to the disk-loaded position, such that the disk is clamped between the damper and the turntable, wherein the movable base drive unit includes a first slider which actuates the movable base to the lifted position and presses the disk holder in a radial direction of the disk to separate the disk holder from the disk at the same time as the actuation of the movable base.

In the disk apparatus of the present invention, the disk holder reliably holds the disk by pushing the disk in the radial direction by an actuating force of a spring member. It is not necessary to push the surface of the disk by a relatively large actuating force in the direction perpendicular to the surface of the disk as in the conventional disk apparatus. Further, it is possible to easily separate the disk from the disk holder by using a relatively small force to actuate the movement of the disk holder because the load of the motor required to lower the first slider of the movable base drive unit is remarkably reduced. Hence, in the disk apparatus of the present invention, when installed in the vertical position, it is possible to provide an increased reliability of the disk holding and clamping operations and a simple construction of the movable base drive unit.

Further, in the disk apparatus of the present invention, when the tray is moved to the disk-loaded position, the first slider, supported on the chassis, does not contact the movable base which is resiliently supported on the chassis in a floated condition. It is possible for the disk apparatus of the present invention to prevent the movable base from being influenced by vibrations which may be given to the chassis or the tray. It is possible to avoid an error of positioning of the pickup on the movable base for the disk due to the influence of vibrations.

In the disk apparatus of the present invention, even when an impact is given to the tray, the impact is not transferred from the tray to the movable base. It is not necessary to provide a protection cover at an insertion opening of a front bezel as in the conventional disk apparatus. The disk apparatus of the present invention provides a simple construction of the movable base drive unit and an increased reliability of the disk holding and clamping operations.

BRIEF DESCRIPTION OF THE DRAWINGS

The above and other objects, features and advantages of the present invention will be more apparent from the following detailed description when read in conjunction with the accompanying drawings in which:

FIG. 7A, FIG. 7B and FIG. 7C are diagrams showing a construction of an emergency arm of the movable base drive unit.

DETAILED DESCRIPTION OF THE PREFERRED EMBODIMENTS

A description will now be given of the preferred embodiments of the present invention with reference to the accompanying drawings.

Figure 1:
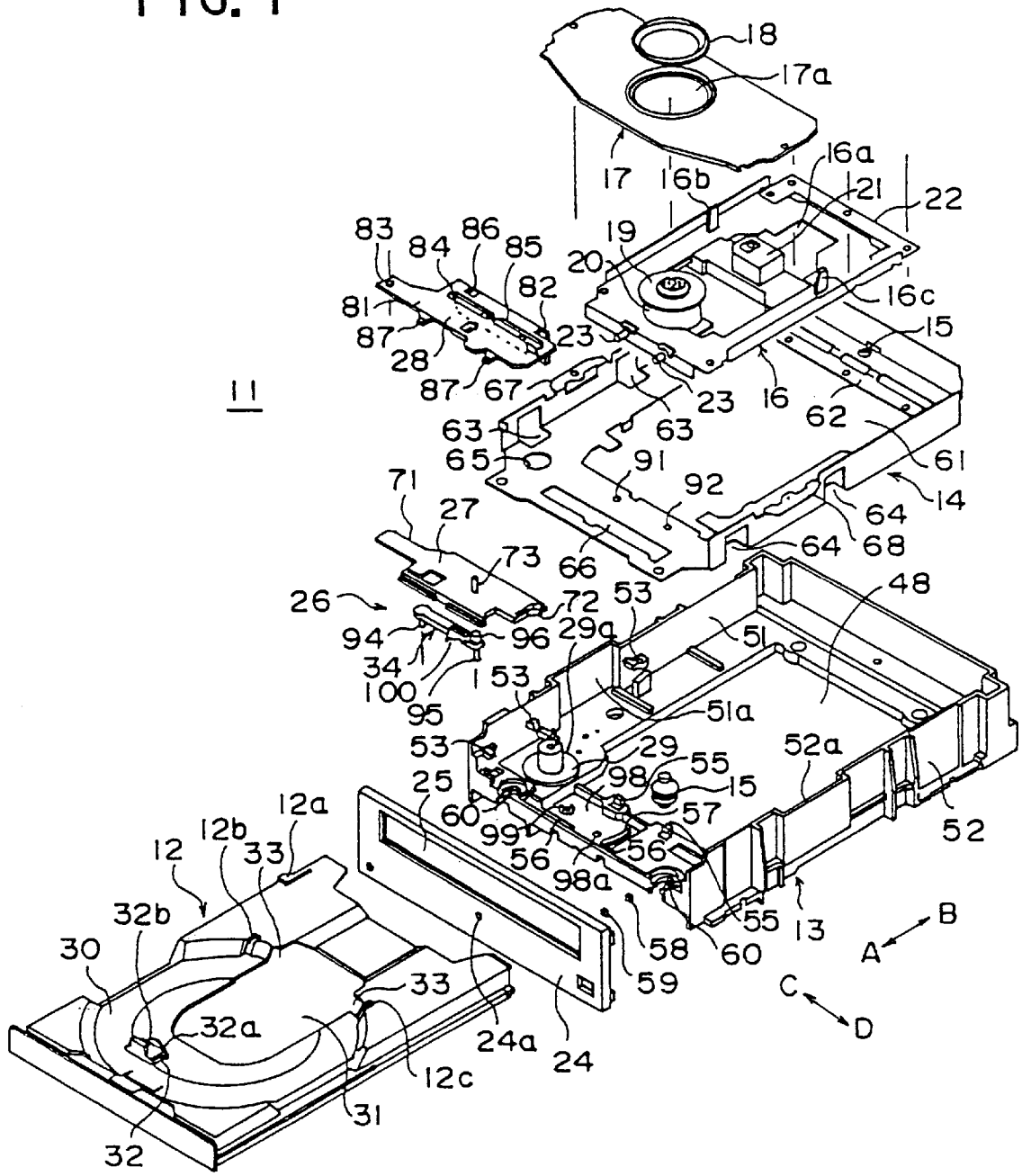
FIG. 1 is an exploded view of one embodiment of a disk apparatus of the present invention.
Figure 2:
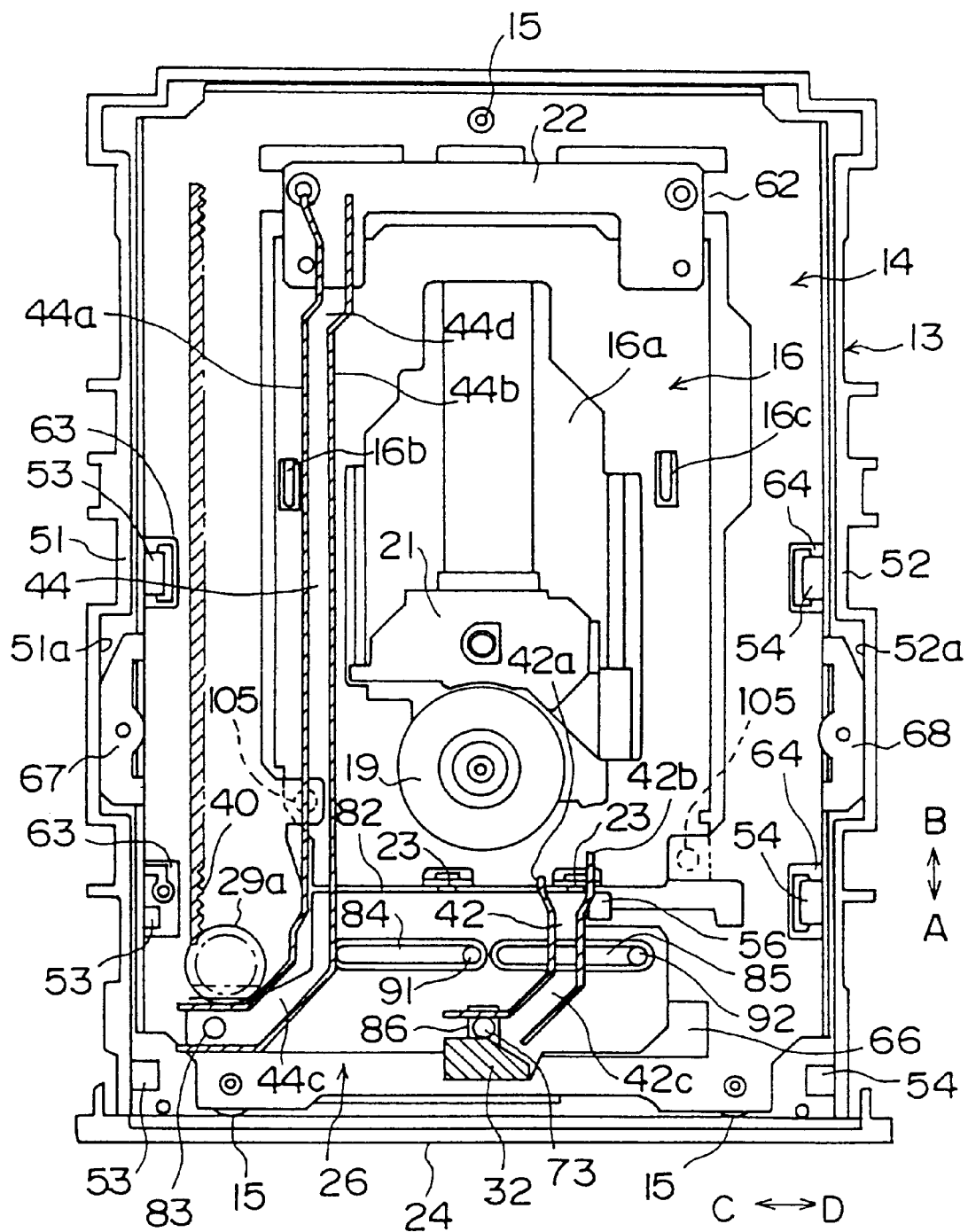
FIG. 2 is a top view illustrating the disk apparatus in which a tray is removed but guide grooves on the bottom of the tray are left.
Figure 3:
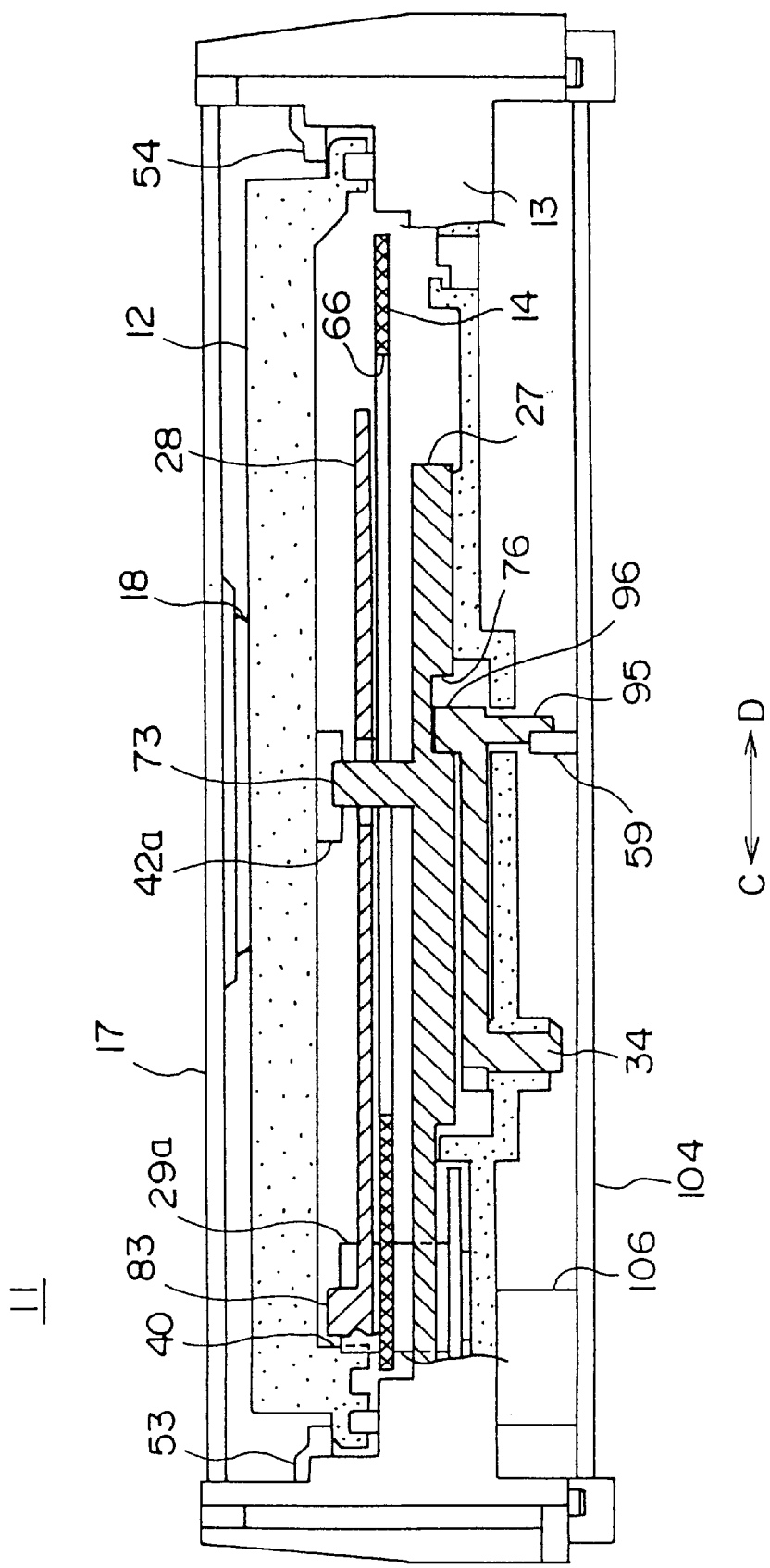
FIG. 3 is a front view illustrating the disk apparatus in which a movable base drive unit is included.

FIG. 1 shows one embodiment of a disk apparatus according to the present invention. FIG. 2 is a top view of the disk apparatus in which a tray is removed but guide grooves on the bottom of the tray are left. FIG. 3 is a front view showing a construction of a movable base drive unit in the disk apparatus.

As shown in FIG. 1 through FIG. 3, the disk apparatus 11 of the present embodiment is a CD-ROM drive in which a CD-ROM (hereinafter called the disk) is held on a movably supported tray that is movable between a disk-change position and a disk-loaded position. In the disk apparatus 11, a tray 12 on which the disk is placed and carried is movably supported. The tray 12 is movable between a disk-change position and a disk-loaded position within the disk apparatus 11 in one of an ejecting direction (indicated by the arrow A in FIG. 1), and an inserting direction (indicated by the arrow B in FIG. 1). The tray 12 is movably supported on a chassis 13, and the chassis 13 is fixed to a personal computer or the like.

Hereinafter, the ejecting direction will be called the direction A and the inserting direction will be called the direction B. Further, a left direction (indicated by the arrow C in FIG. 1) of the disk apparatus 11 perpendicular to both the direction A and the direction B will be called the direction C, and a right direction (indicated by the arrow D in FIG. 1) of the disk apparatus 11 perpendicular to both the direction A and the direction B will be called the direction D.

A floating chassis 14 is provided in the disk apparatus 11 such that the floating chassis 14 is supported on the chassis 13 in a floated condition. Insulator rubber parts 15 are provided at two front positions between the chassis 13 and the floating chassis 14 and provided at a rear center position between the chassis 13 and the floating chassis 14. The insulator rubber parts 15 serve to absorb vibrations. A movable base 16 is movably supported on the floating chassis 14 such that the movable base 16 can be lifted or lowered.

A damper holder 17 is provided above the floating chassis 14, and side portions of the damper holder 17 are fixed to sides of the floating chassis 14. The clamper holder 17 has a central hole 17a in the center of the clamper holder 17. A damper 18 is rotatably attached to the central hole 17a of the clamper holder 17. The clamper 18 is fitted onto a central hole of the disk.

In the disk apparatus 11, a weight of the clamper holder 17 and a weight of the damper 18 are provided in addition to a weight of the floating chassis 14. The additional weight to the weight of the floating chassis 14 makes the natural frequency of the floating chassis 14 deviate from the resonant frequency, and makes the floating chassis 14 less susceptible to vibrations which may be given to the chassis 13 or the tray 12.

A turntable 19 and a disk motor 20 are supported on the top of the movable base 16. The disk is placed on the turntable 19 and rotated by rotation of the turntable 19. The disk motor 20 generates a rotating force to rotate the turntable 19. The movable base 16 has an opening 16a in which an optical pickup 21 is movably provided. The pickup 21 optically reads information from the disk which is rotated on the turntable 19. The pickup 21 is movable in a radial direction (parallel to the direction A or the direction B) of the disk relative to the movable base 16.

A leaf spring 22 is attached to a rear end of the movable base 16. The leaf spring 22 is connected to the floating chassis 14. The leaf spring 22 exerts an actuating force on the movable base 16 so as to rotate the movable base 16 around the leaf spring 22 in the upward vertical direction. As described above, the insulator rubber part 15 is provided at the rear center position between the chassis 13 and the floating chassis 14. The rear end of the floating chassis 14 is supported on the chassis 13 through the insulator rubber part 15 in a floated condition. A pair of pins 23 are attached to a front end of the movable base 16, and the pins 23 are extending from the front end of the movable base 16 in the direction A. A drive force to lift or lower the movable base 16 is transmitted through the pins 23.

Further, the movable base 16 includes disk pressing parts 16b and 16c which upwardly project from the movable base 16 at side positions, and the disk pressing parts 16b and 16c contact the periphery of the disk on the tray 12 at the disk-loaded position, and support the disk clamping operation in a case in which the disk apparatus is installed in the vertical position. Each of the disk pressing portions 16b and 16c has a tapered surface which contacts the periphery of the disk.

A front bezel 24 is provided on the front side of the chassis 13. The front bezel 24 includes an insertion opening 25 through which the tray 12 is passed. When the disk is intended to be changed with a new disk, the tray 12 is pulled out of the disk apparatus 11 in the direction A from the insertion opening 25. When the disk on the tray 12 is intended to be loaded in the disk apparatus 11, the tray 12 is moved in the direction B, passed through the insertion opening 25, and set at the disk-loaded position within the disk apparatus 11.

In the disk apparatus 11 of the present embodiment, the front bezel 24 includes no protective cover which opens and closes the insertion opening 25 of the front bezel 24 in accordance with the movement of the tray 12. Hence, after the tray 12 is moved to the disk-loaded position, the front end of the tray 12 is exposed from the insertion opening 25.

In the disk apparatus 11 of the present embodiment, a movable base drive unit 26 is provided on the front side of the chassis 13 and the floating chassis 14. The movable base drive unit 26 functions to lift or lower the front end of the movable base 16. In the present embodiment, the movable base drive unit 26 generally has a first slider 27, a second slider 28, and an emergency arm 34. The first slider 27 is movably supported on the top of the chassis 13 such that the first slider 27 is movable in one of the direction C and the direction D. The second slider 28 is movably supported on the top of the floating chassis 14 such that the second slider 28 is movable in one of the direction C and the direction D. The emergency arm 34 is rotated in one of a clockwise direction and a counter-clockwise direction in accordance with the movement of the first slider 27. A construction and operations of the respective elements of the movable base drive unit 26 will be described later.

A drive motor 106 is provided on the chassis 13 to generate a driving force for actuating the movable base drive unit 26. The motor 106 rotates a two-stage gear 29 through a reduction gear (not shown) to actuate the movable base drive unit 26. The rotating direction of the motor 106 is switched to one of a forward rotating direction and a reverse rotating direction in response to a control signal supplied from a control circuit (not shown) of the disk apparatus 11. The motor 106 functions as a power source for lifting or lowering the front end of the movable base 16 and for moving the tray 12 in one of the direction A and the direction B.

Further, a rubber part 105 is attached to the movable base 16 so that the movable base 16 is pressed by the bottom of the floating chassis 14 through the rubber part 105 when the movable base 16 is lifted. The rubber part 105 in this condition is compressed by the floating chassis 14, and the movable base 16 is stably held by the resilient deformation of the rubber part 105. The rubber part 105 functions to stably support the pins 23 of the movable base 16 on the slanted grooves 89 and 90 of the second slider 28, and prevents the pins 23 from being loosely fitted onto the slanted grooves 89 and 90.

Next, a description will be given of a construction of the tray 12.

As shown in FIG. 1, the tray 12 includes a disk placing surface 30 which is formed on the top of the tray 12 in an annular shape. The disk is placed on the disk placing surface 30 of the tray 12. The tray 12 includes an opening 31 provided on the inside of the disk placing surface 30. When the tray 12 is at the disk-loaded position and the movable base 16 is at the lifted position, the turntable 19 and the pickup 21 are passed through the opening 31 of the tray 12.

As shown in FIG. 1, a disk holder 32 is provided at a front end of the disk placing surface 30 of the tray 12 such that the disk holder 32 is movable in a radial direction of the disk (or in one of the direction A and the direction B). Further, disk holding portions 33 are provided at rear positions of the disk placing surface 30 of the tray 12. The disk holding portions 33 hold a periphery of the disk at the rear positions of the disk placing surface 30.

The disk holder 32 includes a slanted portion 32a and a disk holding portion 32b. A connecting pin 73 (which will be described later) of the first slider 27 is brought into contact with the slanted portion 32a of the disk holder 32. The disk holding portion 32b is provided to confront the disk holding portions 33 of the tray 12 and functions to hold the periphery of the disk with the disk holding portions 33. The disk holder 32 is resiliently supported on the tray 12.

When the disk is placed on the disk placing surface 30 of the tray 12, the disk is held at the front end by the disk holder 32 and at the rear positions by the disk holding portions 33. Hence, the disk does not fall down from the tray 12 in the case in which the disk apparatus 11 is installed in the vertical position.

Further, a stopper 12a is provided at a left, rear portion of the tray 12. The stopper 12a functions to inhibit the movement of the tray 12 to the disk-change position.

Figure 4:
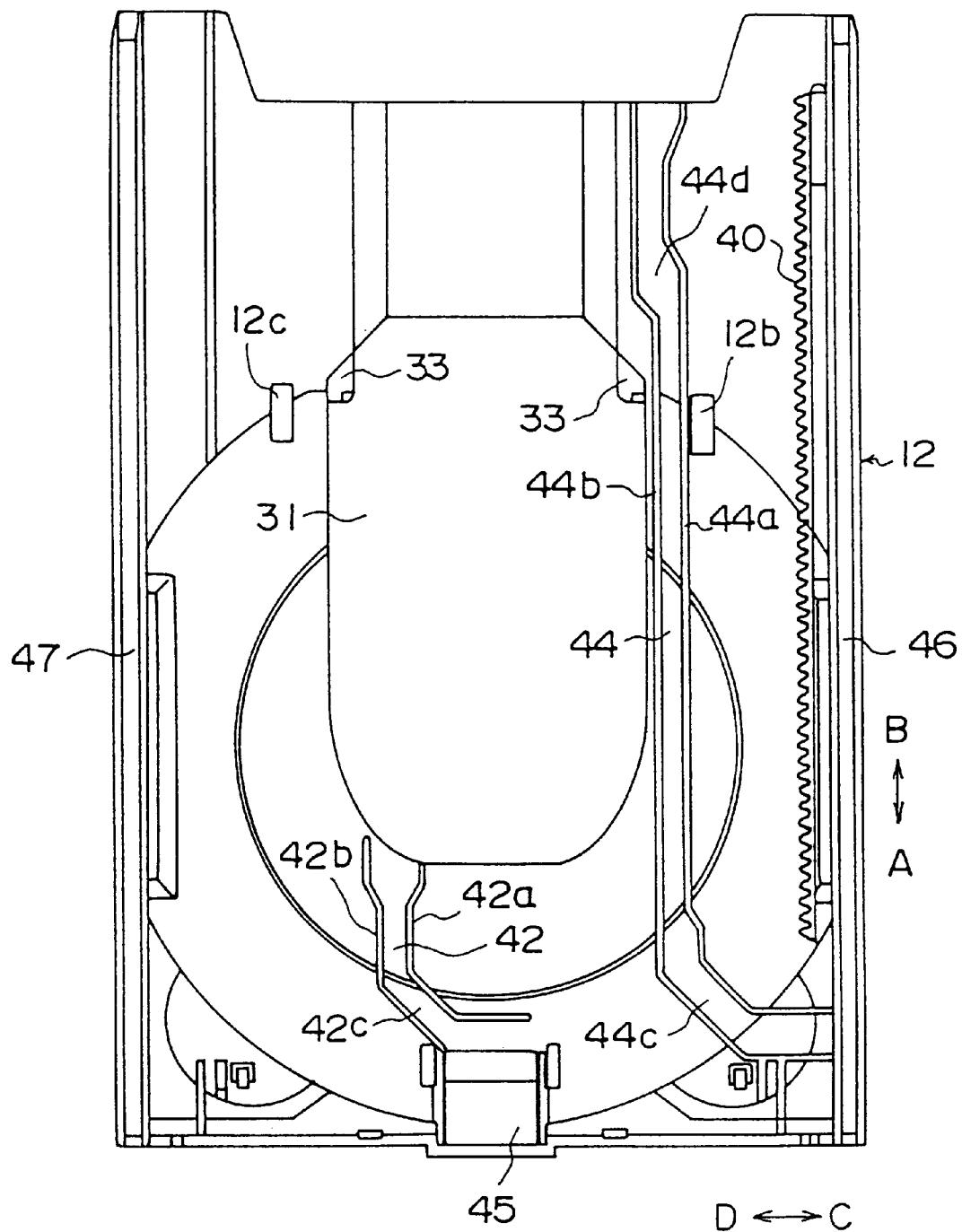
FIG. 4 is a bottom view of the tray in the disk apparatus.

FIG. 4 is a bottom view of the tray 12 in the disk apparatus 11 of FIG. 1. In FIG. 4, the tray 12 which is inverted is illustrated.

As shown in FIG. 4, a rack 40 is provided on the bottom of the tray 12 at the left-hand side portion thereof. The rack 40 extends on the bottom of the tray 12 in the directions A and B. A gear 106a of the motor 106 is engaged with the rack 40. Further, a first guide groove 42 and a second guide groove 44 are provided on the bottom of the tray 12. The first guide groove 42 functions to guide the movement of the first slider 27. The second guide groove 44 functions to guide the movement of the second slider 28. The first guide groove 42 is formed by raised portions 42a and 42b and an internal space between the raised portions 42a and 42b. The raised portions 42a and 42b extend from the bottom of the tray 12. The first guide groove 42 includes a slanted portion 42c. When the connecting pin 73 of the first slider 27 passes through the slanted portion 42c of the first guide groove 42, the first slider 27 is moved in one of the direction C and the direction D.

The first guide groove 42 is provided on the bottom of the tray 12 such that the first guide groove 42 merges with the opening 31 of the tray 12. When the connecting pin 73 of the first slider 27 is within the opening 31 of the tray 12, the connecting pin 73 is not connected to the first guide groove 42. The connecting pin 73 of the first slider 27 is fitted into the first guide groove 42 in the course of the movement of the tray 12 to the disk-loaded position.

Similar to the first guide groove 42, the second guide groove 44 is formed by raised portions 44a and 44b and an internal space between the raised portions 44a and 44b. The raised portions 44a and 44b extend from the bottom of the tray 12. The second guide groove 44 includes slanted portions 44c and 44d. When a pin 86 (which will be described later) of the second slider 28 passes through the slanted portion 44c or the slanted portion 44d of the second guide groove 44, the second slider 28 is moved in one of the direction C and the direction D.

A mounting hole 45 is provided at the front end on the bottom of the tray 12. The disk holder 32 is mounted in the mounting hole 45 such that the disk holder 32 is movable in one of the direction A and the direction B. A pair of slide rails 46 and 47 are provided on both sides of the bottom of the tray 12. Both the slide rails 46 and 47 extend on the bottom of the tray 12 in the directions A and B. Further, a pair of small openings 12b and 12c are in the tray 12 as shown in FIG. 4. The disk pressing parts 16b and 16c of the movable base 16 pass through the openings 12b and 12c of the tray 12.

Next, a description will be given of a construction of the chassis 12 in the disk apparatus 11.

As shown in FIG. 1, the chassis 13 includes side walls 51 and 52 on both sides of the chassis 13, and tray supporting portions 53 and 54 provided inside the side walls 51 and 52. Both the tray supporting portions 53 and the tray supporting portions 54 are provided at a plurality of side positions (in the present embodiment, three side positions) such that the slide rails 46 and 47 on the bottom of the tray 12 contact the tray supporting portions 53 and 54 to allow the tray 12 to be movably supported on the chassis 13. Further, a recessed portion 51a is provided in the middle of the side wall 51 along the directions A and B, and a recessed portion 52a is provided in the middle of the side wall 52 along the directions A and B.

An opening 48 is formed on the bottom of the chassis 13. A pair of lugs 55 and 56 are provided at front positions of the bottom of the chassis 13 outside the opening 48. The lugs 55 and 56 hold the first slider 27 on the chassis 13 such that the first slider 27 is movable in one of the direction C and the direction D. An arch-like hole 57 is provided at a front position of the bottom of the chassis 13. An ejection switch 58 and a clamp switch 59 each of which is constituted of a micro switch are provided at both ends of the arch-like hole 57. A printed-circuit board (not shown) is provided beneath the chassis 13, and the ejection switch 58 and the clamp switch 59 are connected to the printed-circuit board. Further, a pair of stepped recesses 60 are provided at front positions of the bottom of the chassis 13. The stepped recesses 60 are configured to match with the shape of the insulator rubber parts 15.

Next, a description will be given of a construction of the floating chassis 14 in the disk apparatus 11.

As shown in FIG. 1 and FIG. 2, the floating chassis 14 is resiliently supported on the chassis 13 in the floated condition by the insulator rubber parts 15. The insulator rubber parts 15 absorb the vibrations which may be given to the chassis 13 or the tray 12.

An opening 61 is formed in the floating chassis 14. The movable base 16 passes through the opening 61 of the floating chassis 14 when the movable base 16 is lifted or lowered. The floating chassis 14 includes a leaf spring mounting portion 62 provided at a rear position of the floating chassis 14 outside the opening 61. The leaf spring 22 which resiliently supports the movable base 16 is mounted on the leaf spring mounting portion 62 so that the leaf spring 22 is connected to the floating chassis 14. Further, cut-out openings 63 and 64 are formed at side positions of the floating chassis 14 on both sides thereof. The tray supporting portions 53 and 54 of the chassis 13 are loosely fitted into the cut-out openings 63 and 64.

As described above, the floating chassis 14 is supported on the chassis 13 such that the floating chassis 14 does not contact the tray supporting portions 53 and 54 of the chassis 13. Hence, the floating chassis 14 is provided to be less susceptible to the vibrations which may be given to the chassis 13 or the tray 12.

A circular hole 65 and a rectangular hole 66 are formed at a front left corner and a front position of the bottom of the floating chassis 14, respectively. The two-stage gear 29 on the chassis 13 passes through the circuit hole 65. The connecting pin 73 of the first slider 27 passes through the rectangular hole 66.

Further, mounting portions 67 and 68 are provided at side positions of the floating chassis 14 on both sides thereof. The damper holder 17 is fixed to the mounting portions 67 and 68. The mounting portions 67 and 68 outwardly project from the sides of the floating chassis 14. As described above, the recessed portions 51a and 52a are provided in the middle of the side walls 51 and 52 of the chassis 13. When the floating chassis 14 is attached to the chassis 13, the mounting portions 67 and 68 are placed into the recessed portions 51a and 52a. Hence, the floating chassis 14 is supported on the chassis 13 such that the mounting portions 67 and 68 do not contact the chassis 13.

Next, a description will be given of a construction of the movable base drive unit 26 in the disk apparatus 11.

Figure 5A:
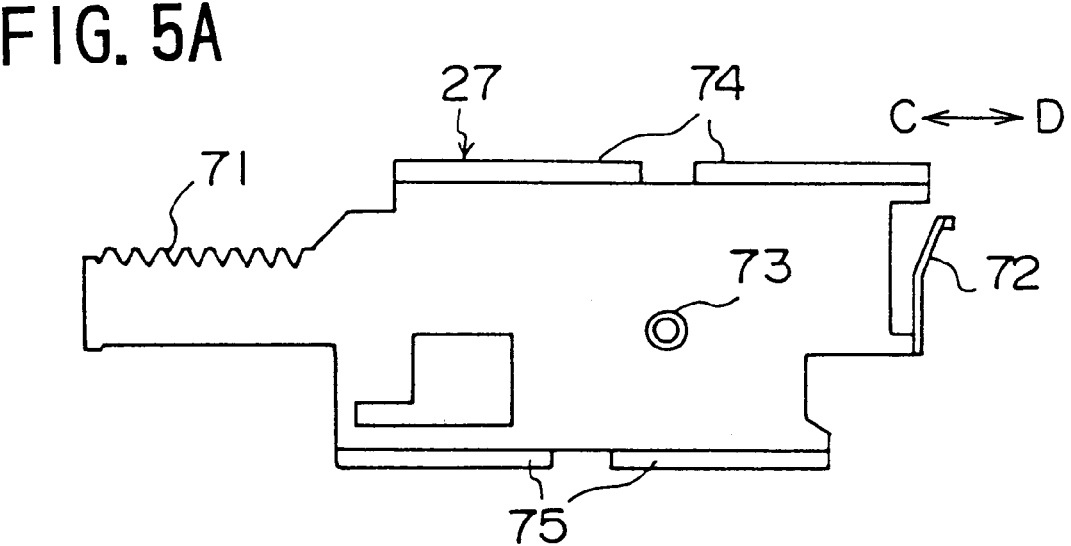
FIG. 5A, FIG. 5B and FIG. 5C are a top view, a side view and a bottom view showing a construction of a first slider of the movable base drive unit.
Figure 5B:
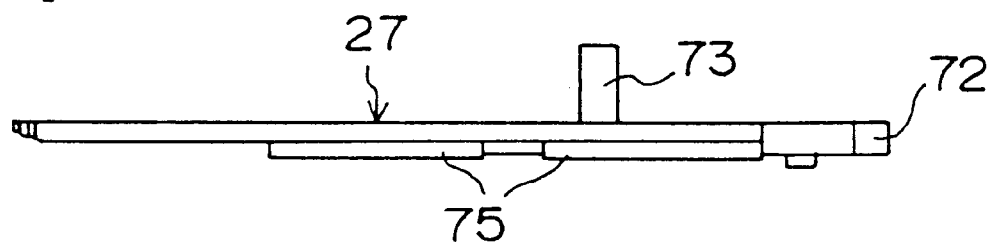
Figure 5C:
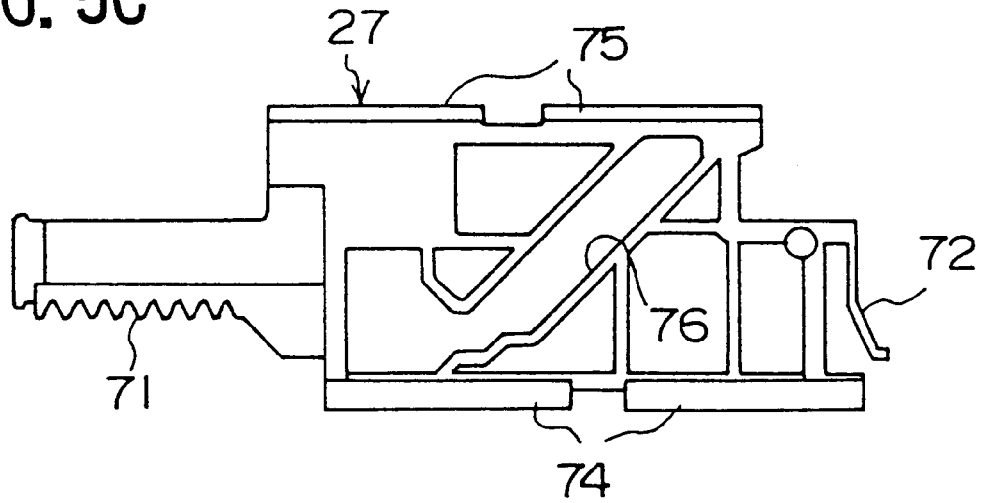

FIG. 5A, FIG. 5B and FIG. 5C are a top view, a side view and a bottom view showing a construction of the first slider 27 of the movable base drive unit 26 in the disk apparatus 11.

As shown in FIG. 5A, FIG. 5B and FIG. 5C, the first slider 27 generally has a rack 71, a spring portion 72, the connecting pin 73, and guide portions 74 and 75. The rack 71 is engaged with the gear 29. The spring portion 72 contacts an internal wall of a recessed portion 98a of the chassis 13. When the spring portion 72 is pressed by the internal wall of the recessed portion 98a of the chassis 13, and the spring portion 72 exerts an actuating force on the first slider 27 so as to press the first slider 27 in the direction C. The connecting pin 73 upwardly projects from the top of the first slider 27, and is connected to the second slider 28. The guide portions 74 and 75 are slidably supported on the lugs 55 and 56 to guide the movement of the first slider 27. The spring portion 72 slantingly extends toward the direction D. When the tray 12 is moved to the disk-change position, the first slider 27 is pressed in the direction C by the actuating force of the spring portion 72.

A cam groove 76 is provided on the bottom of the first slider 27, and the cam groove 76 slantingly extend on the bottom of the first slider 27 with respect to both the direction C and the direction D. The emergency arm 34 is provided beneath the first slider 27. A pin 96 (which will be described below) of the emergency arm 34 is fitted into the cam groove 76. The emergency arm 34 is rotated by the connection of the pin 96 and the cam groove 76 during the movement of the first slider 27, and the emergency arm 34 presses one of the ejection switch 58 and the clamp switch 59 so that one of the switches 58 and 59 is turned ON.

Figure 6B:
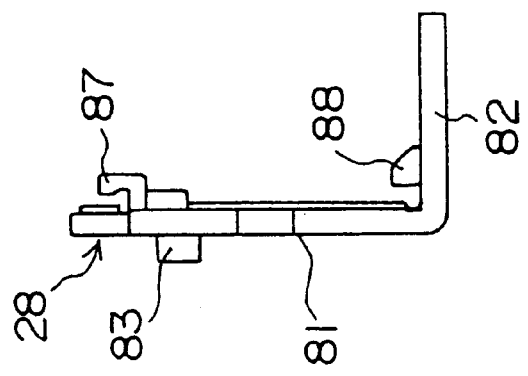
FIG. 6A, FIG. 6B and FIG. 6C are a top view, a side view and a front view showing a construction of a second slider of the movable base drive unit.
Figure 6A:
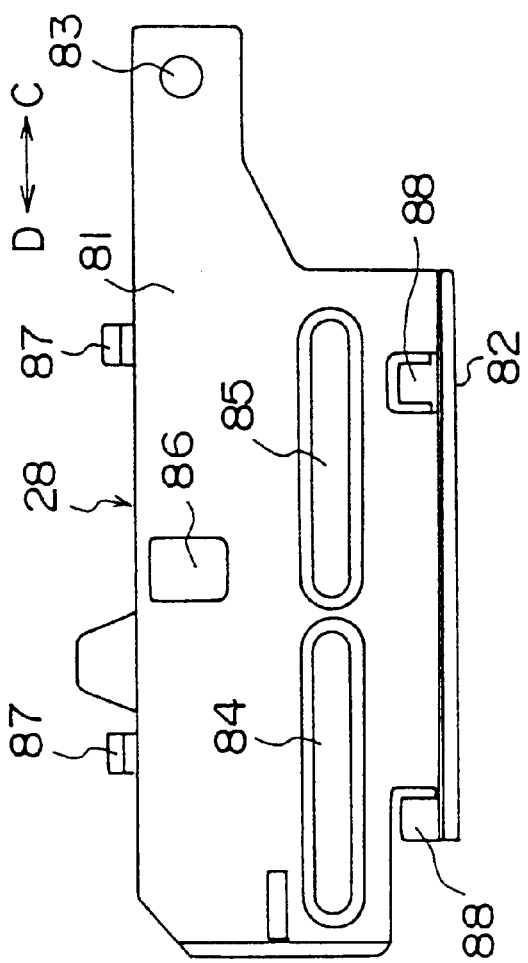
Figure 6C:
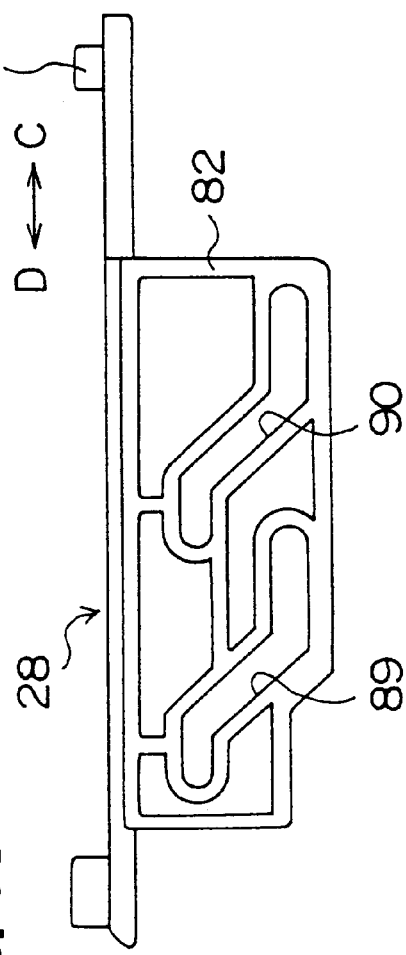

FIG. 6A, FIG. 6B and FIG. 6C are a top view, a side view and a front view showing a construction of the second slider 28 of the movable base drive unit 26 in the disk apparatus 11.

As shown in FIG. 6A, FIG. 6B and FIG. 6C, the second slider 28 is formed into a generally L-shaped member. The second slider 28 generally has a plane portion 81 and a cam portion 82. The floating chassis 14 is slidably supported on the plane portion 81. The cam portion 82 downwardly extends from one end of the plane portion 81.

In the plane portion 81 of the second slider 28, a pin 83, a pair of slots 84 and 85, a rectangular hole 86, a guide portion 87, and a guide portion 88 are provided. The pin 83 upwardly projects from the second slider 28. The slots 84 and 85 are formed so as to extend in the directions C and D. The connecting pin 73 of the first slider 27 is loosely fitted into the hole 86. The guide portion 87 is connected to the rectangular hole 66 of the floating chassis 14, and functions to guide the movement of the second slider 28 along the rectangular hole 66. The guide portion 88 is connected to the opening 61 of the floating chassis 14, and functions to guide the movement of the second slider 28.

In the cam portion 82 of the second slider 28, two slanted grooves 89 and 90 are formed. The pins 23 of the front end of the movable base 16 pass through the slanted grooves 89 and 90 of the second slider 28. When the second slider 28 is moved relative to the chassis 13 in the direction C, the front end of the movable base 16 is actuated to the lifted position through the connection of the pins 23 and the slanted grooves 89 and 90. When the movable base 16 is actuated to the lifted position, the turntable 19 lifts the disk on the tray 12, and the disk is clamped between the clamper 18 and the turntable 19 on the movable base 16. In this condition, the disk can be rotated on the turntable 19 to read information from the disk by using the pickup 21.

Further, as shown in FIG. 1, a pair of projections 91 and 92 are provided at front positions of the bottom of the floating chassis 14. The projections 91 and 92 are fitted into the slots 84 and 85 of the second slider 28. The connection of the projections 91 and 92 and the slots 84 and 85 restricts the movement of the second slider 28 in one of the direction C and the direction D.

FIG. 7A, FIG. 7B and FIG. 7C show a construction of the emergency arm 34 of the movable base drive unit 26. FIG. 7A is a side view of the emergency arm 34, FIG. 7B is a bottom view of the emergency arm 34, and FIG. 7C is a cross-sectional view of the emergency arm 34 taken along a line A—A indicated in FIG. 7B.

As shown in FIG. 7A, FIG. 7B and FIG. 7C, the emergency arm 34 generally has a bar-like arm body 93, a rotating shaft 94, a pressing pin 95, and the pin 96. The rotating shaft 94 downwardly projects from one end of the arm body 93. The pressing pin 95 downwardly projects from the other end of the arm body 93. The pin 96 is provided co-axially with the rotating shaft 94, and upwardly projects from the other end of the arm body 93.

Further, in the emergency arm 34, a holding portion 97 is provided on the bottom of the arm body 93, and longitudinally extends along the bottom surface of the arm body 93. A semi-spherical projection 97a is formed at one end of the holding portion 97. The chassis 13 is provided with an arm mounting portion 98. A recess 98a is provided in the arm mounting portion 98 of the chassis 13. When the emergency arm 34 is attached to the arm mounting portion 98, the projection 97a is fitted into the recess 98a.

A mounting hole 99 is provided in the arm mounting portion 98 of the chassis 13. The rotating shaft 94 of the emergency arm 34 is inserted in the mounting hole 99. The pressing pin 95 of the emergency arm 34 is inserted in the arch-like hole 57 of the chassis 13. The rotating shaft 94 is provided at the leading edge with a lug 94a. The lug 94a is pressed on the internal wall of the mounting hole 99, and functions to prevent the removal of the emergency arm 34 from the chassis 13 after the rotating shaft 94 is inserted in the mounting hole 99. When the emergency arm 34 is rotated around the shaft 94, the pressing pin 95 on the bottom of the arm body 93 functions to press and turn ON one of the ejection switch 58 and the clamp switch 59 which are provided on the bottom of the chassis 13.

When the projection 97a of the holding portion 97 is fitted into the recess 98a of the chassis 13, the emergency arm 34 is held at the position where the clamp switch 59 is turned ON by the pin 95.

Further, in the emergency arm 34, a semicircular recessed portion 100 is provided on a side wall of the arm body 93. In a case in which a malfunction has occurred in an electrical system (including the motor 106, a control unit, and others) of the disk apparatus 11 and the movement of the tray 12 is impossible, the recessed portion 100 is forcefully pressed to rotate the emergency arm 34 around the shaft 94 and pull out the tray 12 from the disk-loaded position.

In the above-mentioned case, the user inserts a pin or the like into a small hole 24a of the front bezel 24. When the recessed portion 100 of the emergency arm 34 is forcefully pressed by the pin, the emergency arm 34 is rotated around the shaft 94. By the above manual operation of the user, the first slider 27 and the second slider 28 are moved so as to actuate the movable base 16 to the lowered position. The clamping of the disk between the turntable 19 and the damper 18 on the tray 12 at the disk-loaded position can be canceled. This makes it possible that the user pull out the tray 12 from the disk-loaded position and take out the disk from the tray 12 at the disk-change position.

Next, a description will be given of an operation of the movable base drive unit 26 during the movement of the tray 12 in the disk apparatus 11.

Figure 8:
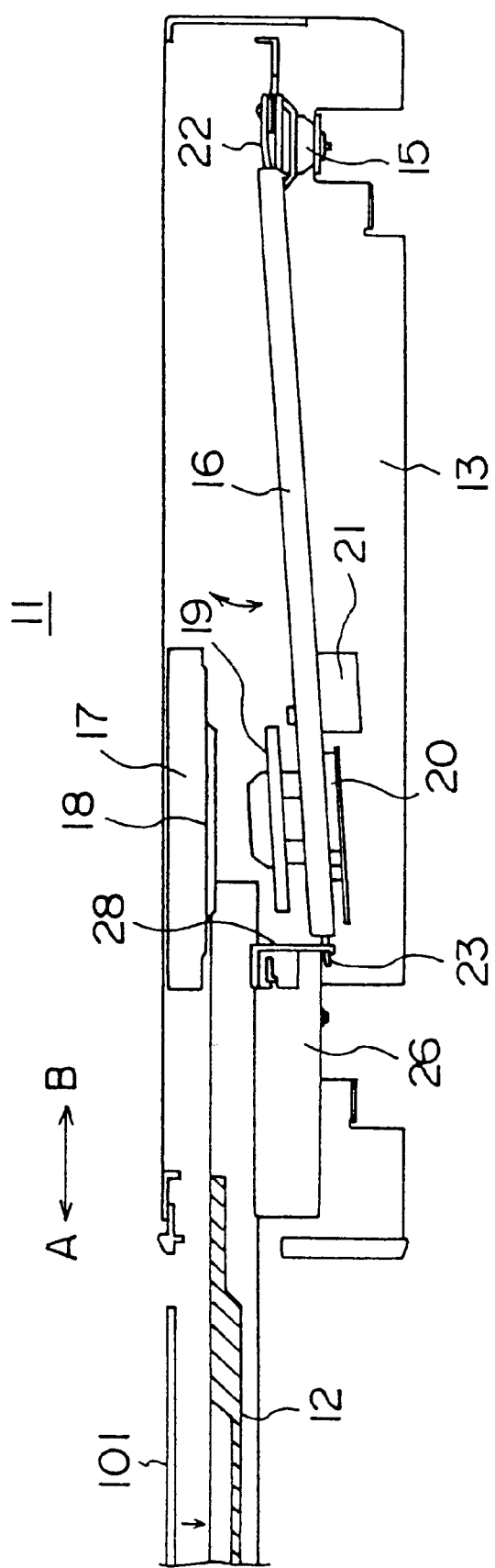
FIG. 8 is a side view illustrating a condition of the disk apparatus in which the tray is moved to a disk-change position.

FIG. 8 shows a condition of the disk apparatus 11 in which the tray 12 is moved to the disk-change position. In FIG. 8, the disk which is to be placed on the tray 12 is indicated by reference numeral 101.

As shown in FIG. 8, the tray 12 is pulled out of the chassis 13 in the direction A and moved to the disk-change position. The front end of the movable base 16 is lowered, and the movable base 16 is in a slanted condition. The actuating force of the leaf spring 22 is canceled by the connection of the pins 23 and the second slider 28. The turntable 19 and the pickup 21 are also lowered together with the movable base 16.

Figure 9:
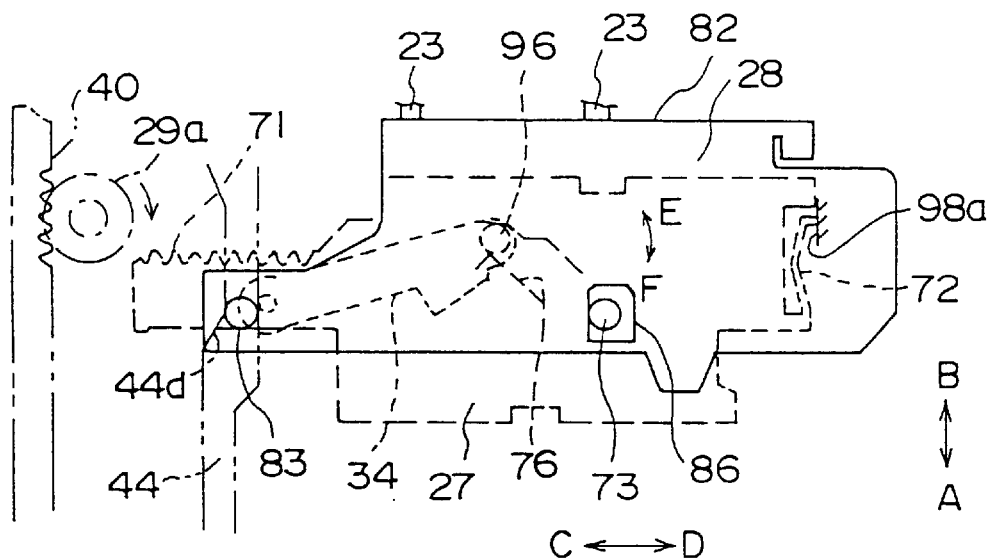
FIG. 9 is a top view illustrating a condition of the disk apparatus in which the movable base drive unit is at a first operating position.

FIG. 9 shows a condition of the disk apparatus 11 in which the movable base drive unit 26 is at a first operating position. The first operating position is indicated by reference numeral "P1" in FIG. 16. Similar to FIG. 8, the tray 12 is moved to the disk-change position.

As shown in FIG. 9, when the tray 12 is at the disk-change position, the rack 40 of the tray 12 is engaged with the two-stage gear 29. The two-stage gear 29 can be rotated by the driving force of the motor 106. The pin 83 of the second slider 28 is fitted into the second guide groove 44 on the bottom of the tray 12, and the pin 83 passes through the slanted portion 44d of the second guide groove 44. The second slider 28 is moved in the direction D and held at this position.

When the movable base drive unit 26 is at the first operating position shown in FIG. 9, the pin 73 of the first slider 27 is fitted into the hole 86 of the second slider 28. The first slider 27 is moved in the direction D together with the second slider 28. Hence, the rack 71 of the first slider 27 is separated from the gear 29, and the first slider 27 is released from the driving force of the motor 106. The spring portion 72 of the first slider 27 is pressed by the internal wall of the recessed portion 98a of the chassis 13, and the spring portion 72 is deflected by the chassis 13.

When the movable base drive unit 26 is at the first operating position, the pins 23 of the movable base 16 are fitted into the slanted grooves 89 and 90 of the second slider 28, and moved along the slanted grooves 89 and 90. As the second slider 28 is moved in the direction D, the front end of the movable base 16 is lowered relative to the second slider 28 by the connection of the pins 23 and the slanted grooves 89 and 90. Hence, the movable base 16 is in the slanted condition shown in FIG. 8.

The emergency arm 34 is provided below the first slider 27. The pin 96 of the emergency arm 34 is fitted into the cam groove 76 of the first slider 27. The emergency arm 34 is rotated around the shaft 94 in a rotating direction E indicated in FIG. 9. The pin 95 of the emergency arm 34 presses the ejection switch 58 on the bottom of the chassis 13, and the ejection switch 58 is turned ON.

Figure 10:
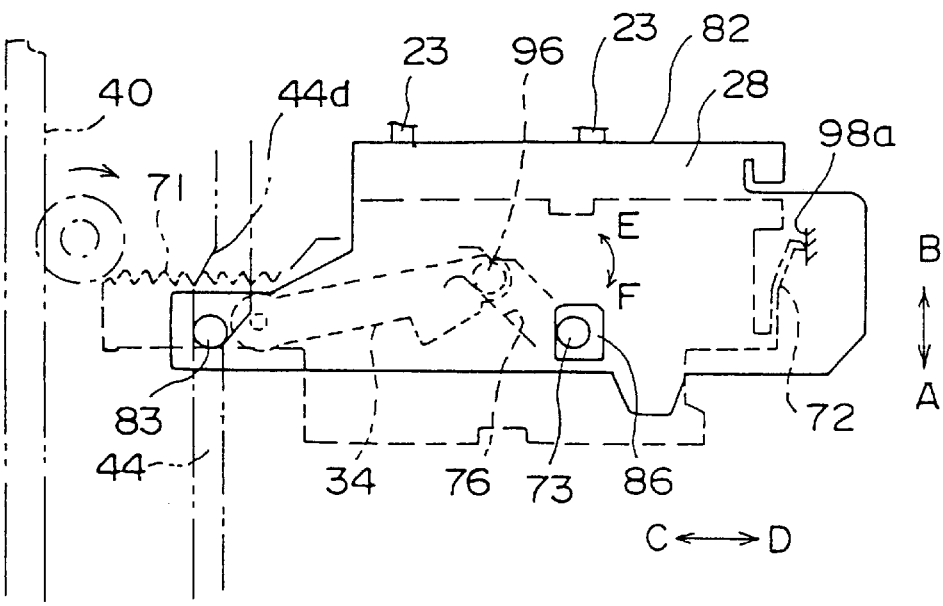
FIG. 10 is a top view illustrating a condition of the disk apparatus in which the movable base drive unit is at a second operating position.

FIG. 10 shows a condition of the disk apparatus 11 in which the movable base drive unit 26 is at a second operating position. The second operating position is indicated by reference numeral "P2" in FIG. 16. After the disk is placed on the disk placing surface 30 of the tray 12, the tray 12 is manually pushed in the direction B. The tray 12 starts being moved from the disk-change position in the direction B.

As shown in FIG. 10, the slanted portion 44c of the second guide groove 44 on the bottom of the tray 12 presses the pin 83 of the second slider 28 in the direction C. The second slider 28 is moved in the direction C by the movement of the tray 12.

The spring portion 72 of the first slider 27 is deflected by the recessed portion 98a of the chassis 13, and the first slider 27 is pressed in the direction C due to the actuating force of the spring portion 72. Hence, the first slider 27 and the second slider 28 start being smoothly moved in the direction C along the slanted portion 44c of the second guide groove 44.

At this time, the emergency arm 34 is rotated around the shaft 94 in a rotating direction F indicated in FIG. 10. The pin 95 of the emergency arm 34 is separated from the ejection switch 58 on the bottom of the chassis 13, and the ejection switch 58 is turned OFF. When the ejection switch 58 is turned OFF, the motor 106 starts rotating the two-stage gear 29 clockwise (or in a forward rotating direction of the motor 106).

Figure 11:
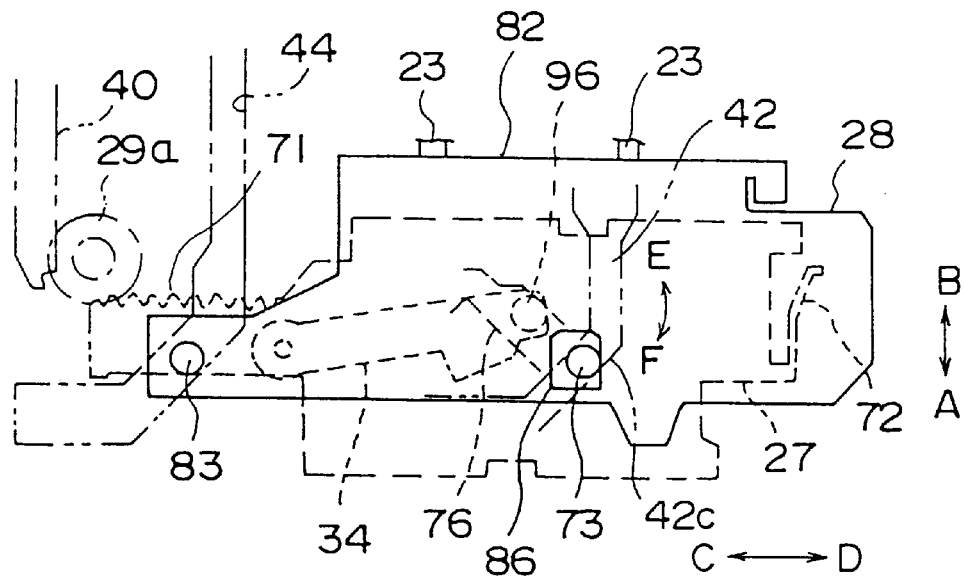
FIG. 11 is a top view illustrating a condition of the disk apparatus in which the movable base drive unit is at a third operating position.

FIG. 11 shows a condition of the disk apparatus 11 in which the movable base drive unit 26 is at a third operating position. The third operating position is indicated by reference numeral P3 in FIG. 16. The tray 12 is being moved in the direction B.

As shown in FIG. 11, the tray 12 is moved in the direction B through the engagement of the gear 29 and the rack 40 with the driving force of the motor 106, and reaches a position immediately preceding the disk-loaded position. The rack 40 of the tray 12 is separated from the gear 29. At the same time, the pin 73 of the first slider 27 and the pin 83 of the second slider 28 are moved in the direction C along the slanted portion 42c of the first guide groove 42 and the slanted portion 44c of the second guide groove 44, respectively. The first guide groove 42 and the second guide groove 44 are provided on the bottom of the tray 12.

The rack 71 of the first slider 27 is moved in the direction C and engaged with the gear 29. Through the engagement of the rack 71 and the gear 29 with the driving force of the motor 106, the pin 73 of the first slider 27 and the pin 83 of the second slider 28 press the slanted portion 42c of the first guide groove 42 and the slanted portion 44c of the second guide groove 44, respectively, in the direction C. The tray 12 is moved in the direction B by the first slider 27 and the second slider 28, and then the tray 12 reaches the disk-loaded position.

Figure 12:
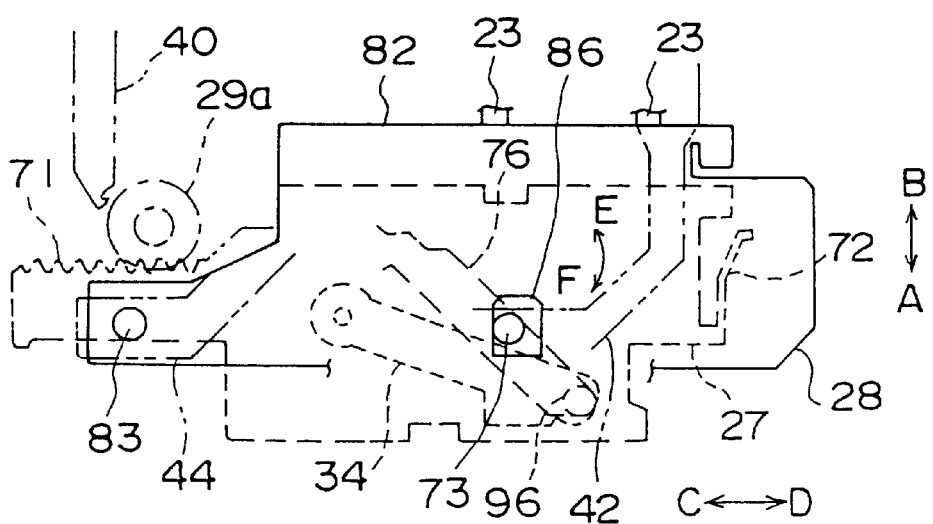
FIG. 12 is a top view illustrating a condition of the disk apparatus in which the movable base drive unit is at a fourth operating position.

FIG. 12 shows a condition of the disk apparatus 11 in which the movable base drive unit 26 is at a fourth operating position. The fourth operating position is indicated by reference numeral P4 in FIG. 16. The tray 12 is moved to the disk-loaded position.

As shown in FIG. 12, the first slider 27 is moved in the direction C to the leftmost position through the engagement of the rack 71 and the gear 29 with the driving force of the motor 106, and the second slider 28 is also moved in the direction C to the leftmost position by the connection of the pin 73 and the hole 86. As the slanted grooves 89 and 90 of the second slider 28 are moved in the direction C, the pins 23 of the movable base 16 are lifted by the movement of the second slider 28. The front end of the movable base 16 is lifted relative to the second slider 28 by the connection of the pins 23 and the slanted grooves 89 and 90.

Hence, the turntable 19 lifts the disk on the tray 12 by the upward movement of the movable base 16, and the disk is clamped between the damper 18 and the turntable 19 when the tray 12 is at the disk-loaded position. The central hole of the disk is easily fitted into a tapered portion of the turntable 19, and the damper 18 is fitted onto the disk on the turntable 19. In this condition, the pickup 21 is placed to confront the bottom surface of the disk. The disk can be rotated on the turntable 19 to read information from the disk by using the pickup 21.

When the disk on the tray 12 is clamped between the clamper 18 and the turntable 19, the pin 73 of the first slider 27 contacts the raised portion 42a of the first guide groove 42 on the bottom of the tray 12. The connection of the pin 73 and the raised portion 42a inhibits the movement of the tray 12 in the direction A. The emergency arm 34 is rotated in the rotating direction F. The pin 95 of the emergency arm 34 presses the clamper switch 59 provided on the bottom of the chassis 13, and the clamp switch 59 is turned ON.

When the clamp switch 59 is turned ON, the forward rotation of the motor 106 is stopped and the motor 106 starts rotating the gear 29 counter-clockwise. In this condition, the pin 83 of the second slider 28 is separated from the raised portions 44a and 44b of the second guide groove 44 on the bottom of the tray 12.

Figure 13:
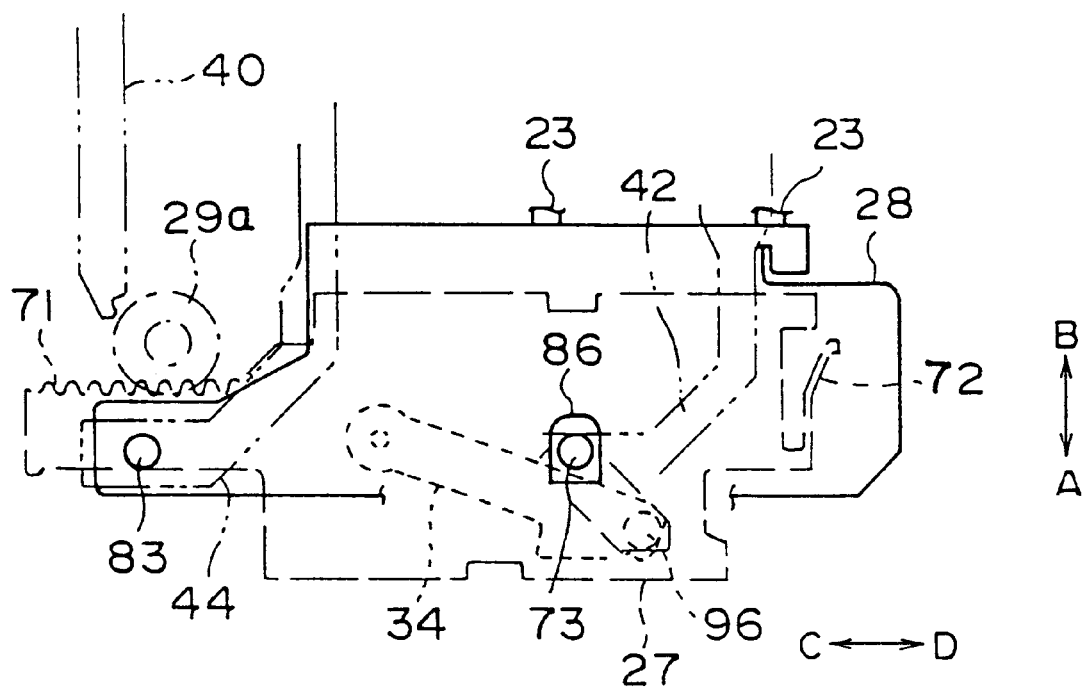
FIG. 13 is a top view illustrating a condition of the disk apparatus in which the movable base drive unit is at a fifth operating position.

FIG. 13 shows a condition of the disk apparatus 11 in which the movable base drive unit 26 is at a fifth operating position. The fifth operating position is indicated by reference numeral P5 in FIG. 16. The tray 12 is at the disk-loaded position. The disk can be rotated on the turntable 19 to read information from the disk by using the pickup 21.

After the ON state of the clamp switch 59 is detected, the motor 106 continuously rotates the gear 29 counter-clockwise (or in a reverse rotating direction of the motor 106) for a given time. As shown in FIG. 13, the first slider 27 is moved in the direction D through the engagement of the rack 71 and the gear 29 with the driving force of the motor 106. The pin 73 of the first slider 27 is shifted to a central position of the hole 86 of the second slider 28, and the pin 73 is disconnected from the hole 86. In other words, the pin 73 is loosely fitted to the hole 86.

As the pin 73 of the first slider 27 is not in contact with the hole 86 of the second slider 28, the second slider 28 is made less susceptible to vibrations which may be given to the chassis 13. During the reverse rotation of the motor 106, the projection 97a of the emergency arm 34 is fitted to the recessed portion 98a of the chassis 13, and the emergency arm 34 is not rotated. The pin 95 of the emergency arm 34 continuously presses the clamp switch 59, and the ON state of the clamp switch 59 is maintained. When the given time has elapsed after the ON state of the clamp switch 59 is detected, the reverse rotation of the motor 106 is stopped.

Figure 14:
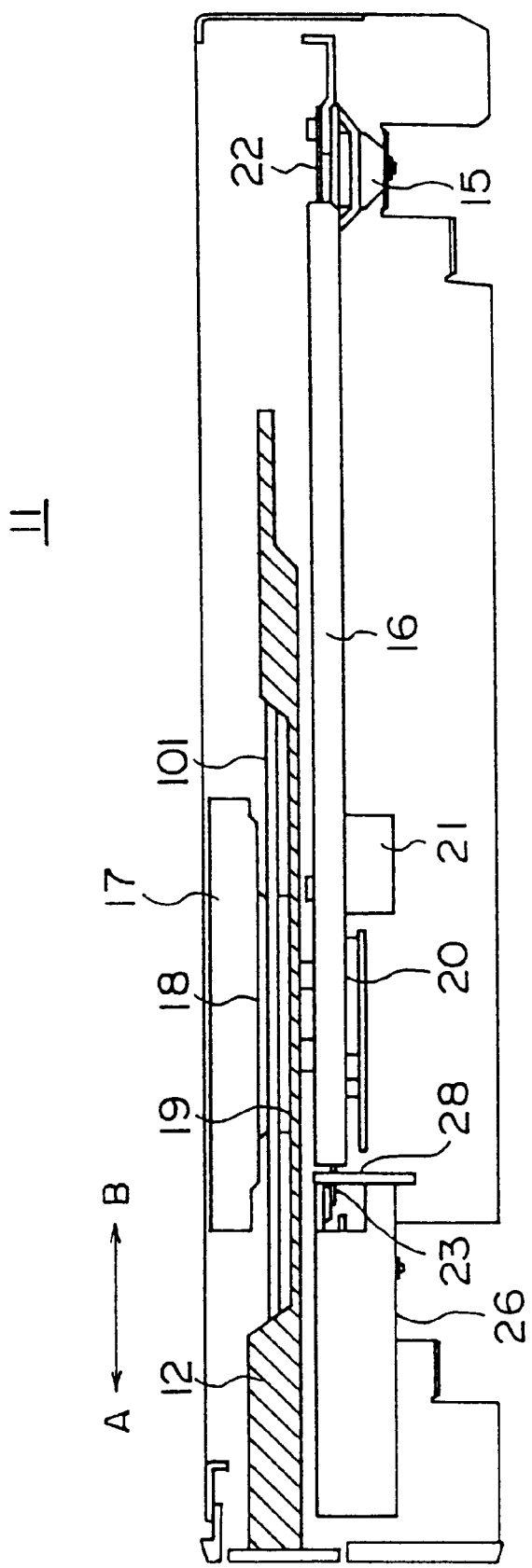
FIG. 14 is a side view illustrating a condition of the disk apparatus in which a movable base is actuated to a lifted position.
Figure 15:
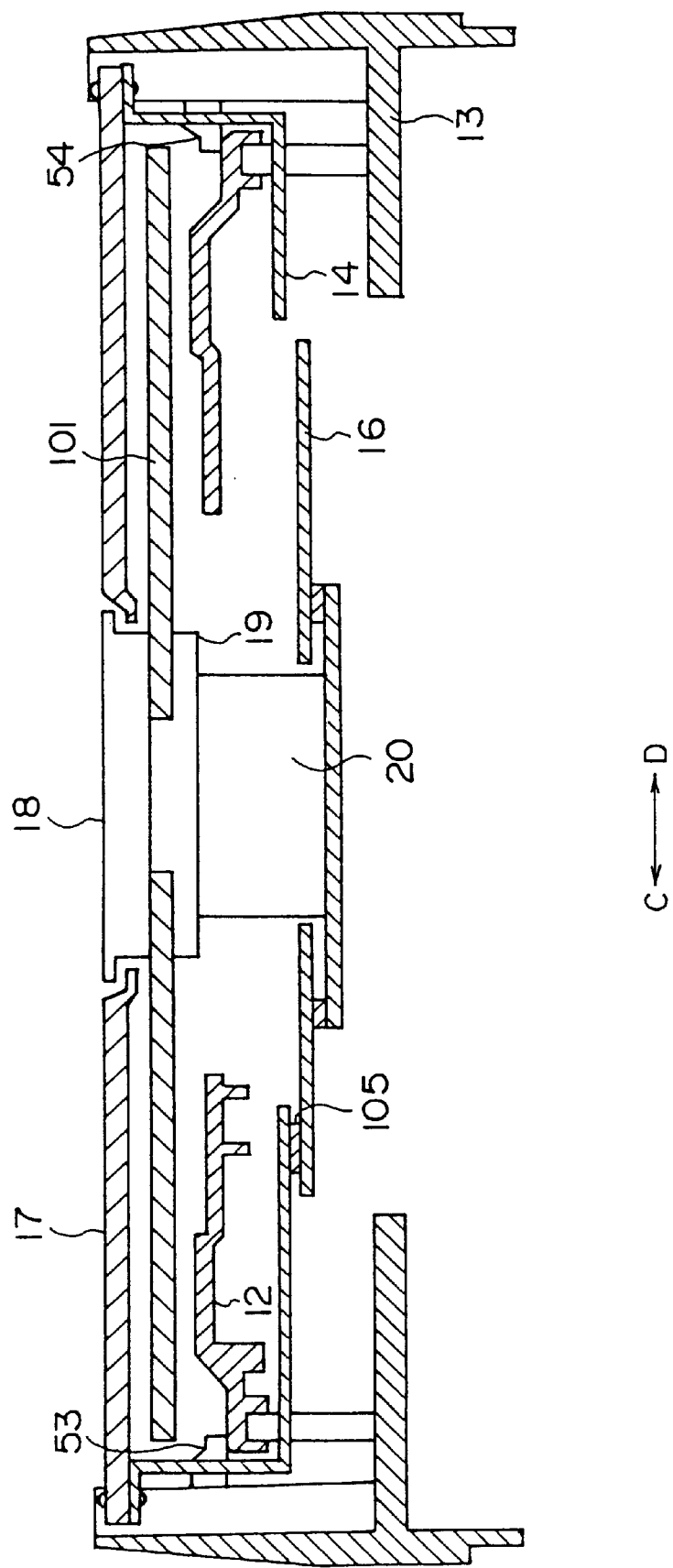
FIG. 15 is a front view illustrating the condition of the disk apparatus in which the movable base is actuated to the lifted position.

FIG. 14 is a side view showing a condition of the disk apparatus 11 in which the movable base 16 is actuated to a lifted position. FIG. 15 is a front view showing the condition of the disk apparatus 16 in which the movable base 16 is actuated to the lifted position. In FIG. 14 and FIG. 15, the disk which is clamped between the clamper 18 and the turntable 19 is indicated by reference numeral 101.

As shown in FIG. 14 and FIG. 15, the movable base 16 is actuated from the slanted position of FIG. 8 to the horizontal lifted position when the tray 12 is moved to the disk-loaded position. When the movable base 16 is actuated to the lifted position, the disk 101 is clamped between the clamper 18 and the turntable 19 on the movable base 16. In this condition, the disk 101 can be rotated on the turntable 19 to read information from the disk by using the pickup 21.

In the disk apparatus 11 of the present embodiment, when the tray 12 is moved to the disk-loaded position, the gear 29, the tray 12, the first slider 27 and the emergency arm 34 (which are supported on the chassis 13) are not in contact with the second slider 28 and the movable base 16 (which are supported on the floating chassis 14). The floating chassis 14 is supported on the chassis 13 in the floated condition through the insulator rubber parts 15. It is possible for the disk apparatus 11 of the present embodiment to prevent the movable base 16 from being influenced by vibrations which may be given to the chassis 13 or the tray 12. Hence, it is possible to avoid an error of positioning of the pickup 21 for the disk 101 due to the influence of vibrations.

In the disk apparatus 11 of the present embodiment, even when an impact is given to the tray 12, the impact is not transferred from the tray 12 to the movable base 16. It is not necessary to provide a protection cover at the insertion opening 25 of the front bezel 25 as in the conventional disk apparatus. The disk apparatus 11 of the present embodiment provides a simple construction of the movable base drive unit and an increased reliability of the disk holding and clamping operations.

Further, the rubber part 105 is attached to the movable base 16 so that the movable base 16 is pressed by the bottom of the floating chassis 14 through the rubber part 105 when the movable base 16 is actuated to the lifted position. The rubber part 105 in this condition is compressed by the floating chassis 14, and the movable base 16 is stably held by the resilient deformation of the rubber part 105. The rubber part 105 functions to stably support the pins 23 of the movable base 16 on the slanted grooves 89 and 90 of the second slider 28, and prevents the pins 23 from being loosely fitted onto the slanted grooves 89 and 90.

Figure 16:
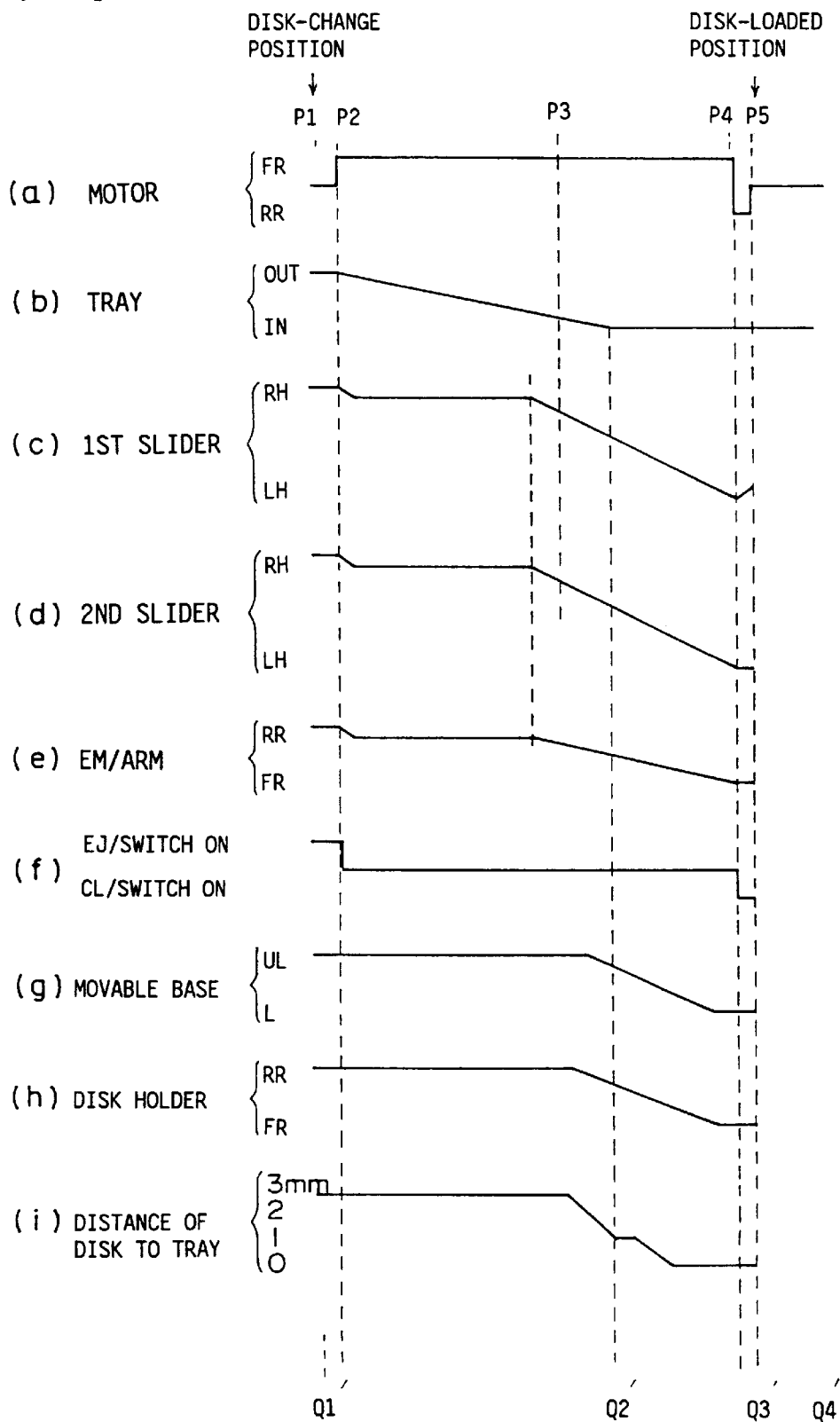
FIG. 16 is a diagram for explaining operations of the elements of the disk apparatus when the movable base drive unit is at each of the various operating positions.

FIG. 16 shows the operations of various elements of the disk apparatus 11 when the movable base drive unit 26 is at each of the first through fifth operating positions "P1"–"P5".

In FIG. 16, (a) indicates the operation of the motor 106 which is controlled to one of the forward rotation ("FR"), the reverse rotation ("RR"), and the stop condition; (b) indicates the operation of the tray 12 which is moved from the disk-change position ("OUT") to the disk-loaded position ("IN"); (c) indicates the operation of the first slider 27 which is moved in one of the direction C ("RH") and the direction D ("LH"); (d) indicates the operation of the second slider 27 which is moved in one of the direction C ("RH") and the direction D ("LH"); (e) indicates the operation of the emergency arm 34 which is rotated in one of the direction E ("RR") and the direction F ("FR"); (f) indicates the operations of the ejection switch 58 and the clamp switch 59 which are controlled to one of the ON state of the ejection switch 58 only ("EJ/SWITCH ON"), the ON state of the clamp switch 59 only ("CL/SWITCH ON") and the OFF state of both; (g) indicates the operation of the movable base 16 which is actuated between the lowered position ("UL") and the lifted position ("L"); (h) indicates the operation of the disk holder 32 which is moved in one of the direction A ("FR") and the direction B ("RR"); and (i) indicates the distance of the disk 101 to the tray 12 which ranges between 3 mm and 0 mm.

Figure 17:
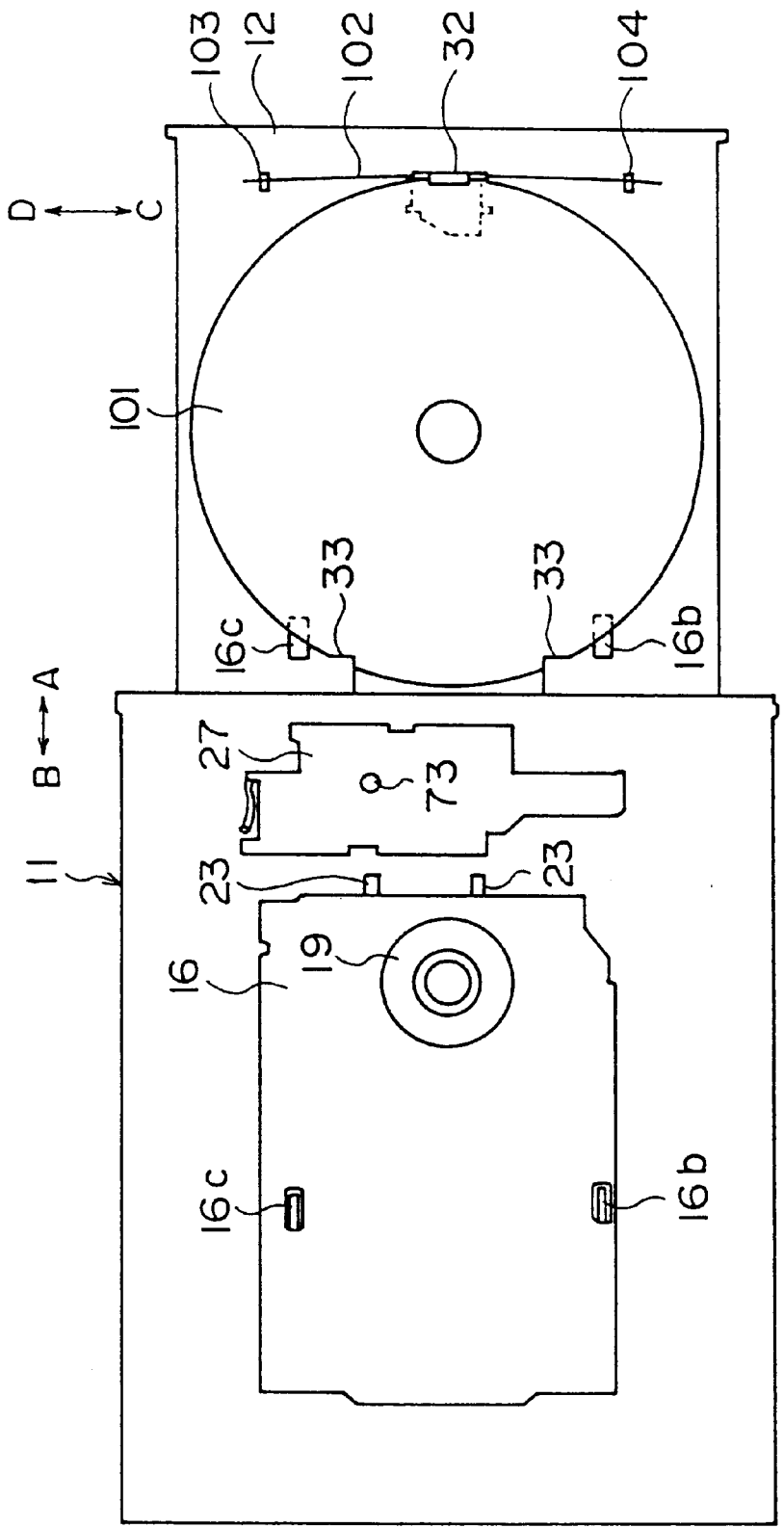
FIG. 17 is a side view illustrating a condition of the disk apparatus in which the tray is pulled out to the disk-change position in a case in which the disk apparatus is installed in the vertical position.

Next, FIG. 17 shows a condition of the disk apparatus 11 in which the tray 12 is pulled out to the disk-change position in a case in which the disk apparatus 11 is installed in its vertical position. The condition of the disk apparatus 11 corresponds to a position that is indicated by reference numeral Q1 in FIG. 16.

Figure 18:
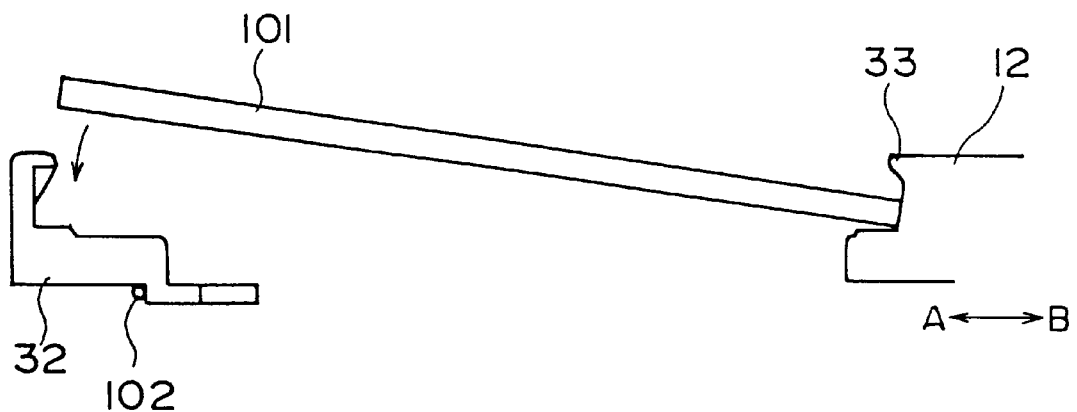
FIG. 18 is a top view illustrating a condition of the disk apparatus in which the disk is being placed to the tray at the disk-change position in the case of the vertical position installation.
Figure 19:
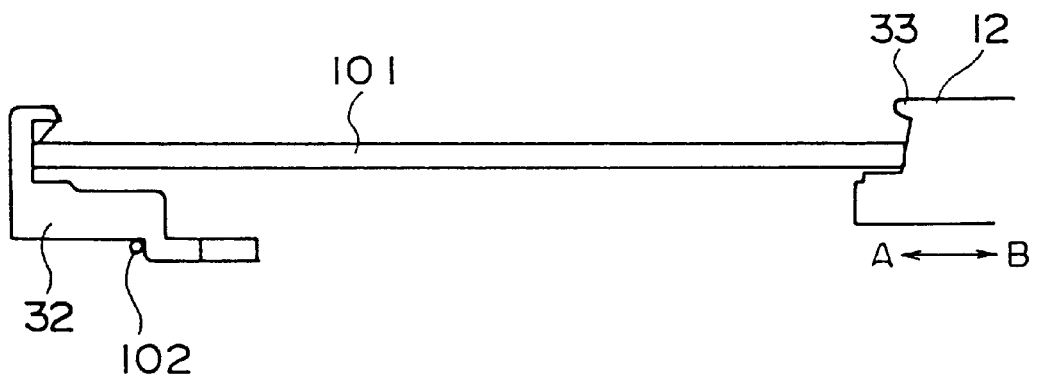
FIG. 19 is a top view illustrating a condition of the disk apparatus in which the disk is already placed on the tray at the disk-change position in the case of the vertical position installation.

FIG. 18 is a top view illustrating a condition of the disk apparatus 11 in which the disk 101 is being placed to the tray 12 at the disk-change position in the case of the vertical position installation. FIG. 19 is a top view illustrating a condition of the disk apparatus 11 in which the disk 101 is placed on the tray 12 at the disk-change position in the case of the vertical position installation.

As shown in FIG. 17, the tray 12 is moved to the disk-change position in the case of the disk apparatus 11 installed in the vertical position. The disk holder 32 is provided at the front end of the disk placing surface 30 of the tray 12, and the disk holding portions 33 are provided at the rear positions of the disk placing surface 30.

In the disk apparatus 11 of the present embodiment, as shown in FIG. 17, a bar-like spring member 102 is provided on the bottom of the tray 12, and the disk holder 32 is supported by the spring member 102 in the center of the spring member 102. Spring fixing parts 103 and 104 are provided at both ends of the spring member 102, and the spring member 102 is fixed to the bottom of the tray 12 by the spring fixing parts 103 and 104. When the disk 101 is placed on the tray 12, the spring member 102 exerts an actuating force on the disk 101 through the disk holder 32 so as to press the periphery of the disk 101 in a radial direction of the disk 101.

Hence, the disk holder 32 reliably holds the disk 101 by pressing the disk 101 in the radial direction by the actuating force of the spring member 102. It is possible for the disk apparatus 11 of the present invention to provide an increased reliability of the disk clamping operation when it is installed in the vertical position. Further, it is not necessary to push the surface of the disk by a relatively large actuating force in the direction perpendicular to the surface of the disk as in the conventional disk apparatus.

In the disk apparatus 11 of the present embodiment, as shown in FIG. 1, the tray 12 includes the openings 12b and 12c. When the tray 12 is moved to the disk-loaded position, the disk pressing parts 16b and 16c of the movable base 16 are passed through the openings 12b and 12c, so that the disk 101 is held by the disk pressing parts 16b and 16c. The distance between the disk holding portions 33 and the disk holder 32 is predetermined such that the distance is slightly smaller than the diameter of the disk 101 (by some millimeters).

As shown in FIG. 18, when the disk 101 is intended to be placed on the tray 12, the rear end of the disk 101 is first brought into contact with the disk holding portions 33 of the tray 12. The disk 101 is then rotated around the disk holding portions 33 as indicated by the arrow in FIG. 18, so that the disk 101 is completely placed on the tray 12.

As shown in FIG. 19, the disk 101 is held on the disk placing surface 30 of the tray 12 by both the disk holder 32 and the disk holding portions 33. The spring member 102 exerts the actuating force on the disk 101 through the disk holder 32 so as to push the periphery of the disk 101 in the radial direction of the disk 101. In this condition, the spring member 102 may be deflected in the direction A such that the disk 101 is easily placed on the tray 12.

Figure 20:
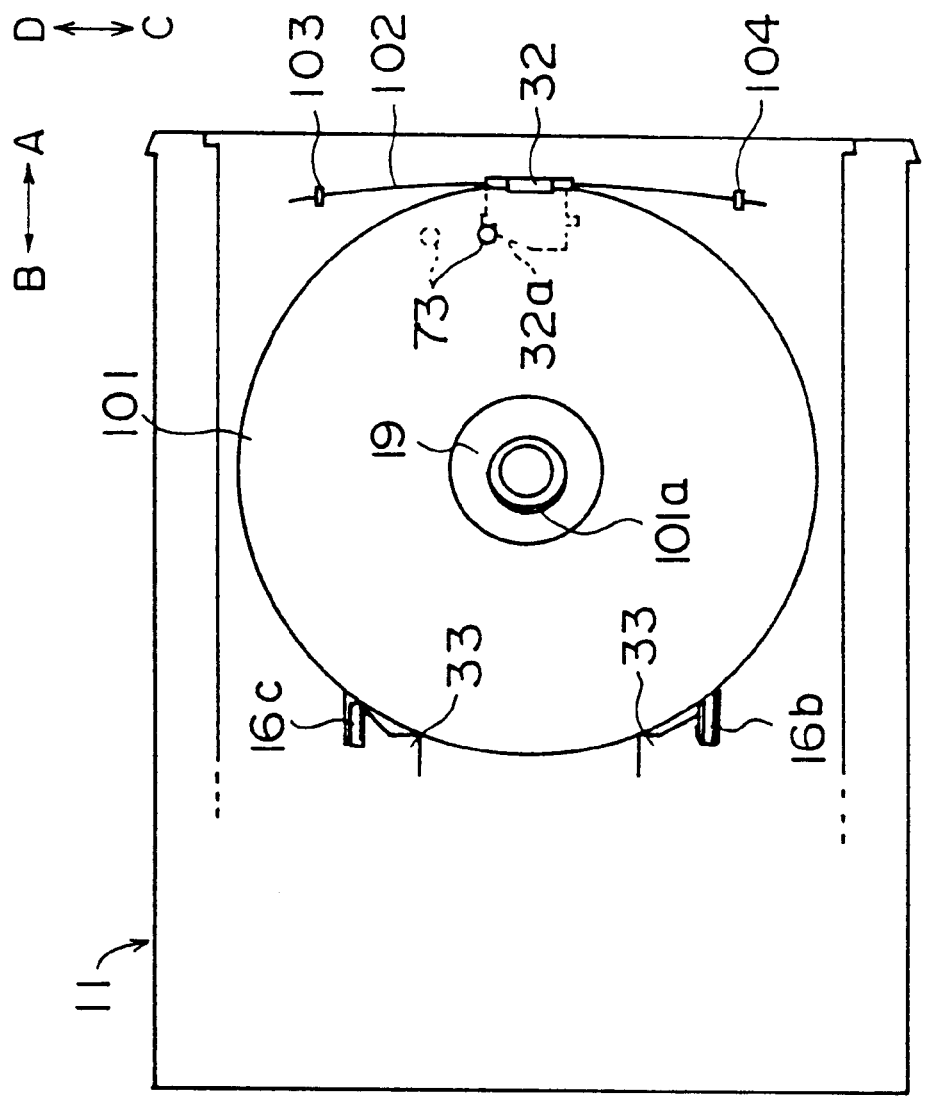
FIG. 20 is a side view illustrating a condition of the disk apparatus in which the tray is moved to a position preceding the disk-loaded position in the case of the vertical position installation.

FIG. 20 shows a condition of the disk apparatus 11 in which the tray 12 is moved to a position preceding the disk-loaded position in the case in which the disk apparatus 11 is installed in its vertical position. The condition of the disk apparatus 11 corresponds to a position that is indicated by reference numeral Q2 in FIG. 16.

As shown in FIG. 20, the tray 12 is moved in the direction B relative to the chassis 13 through the engagement of the gear 29 and the rack 40 with the driving force of the motor 106, and reaches a position immediately preceding the disk-loaded position. At this position, the disk pressing parts 16b and 16c of the movable base 16 are passed through the openings 12b and 12c of the tray 12, so that the disk 101 is held by the disk pressing parts 16b and 16c. The disk pressing parts 16b and 16c push the periphery of the disk 101 in the direction A which is opposite to the direction of the movement of the tray 12. By the action of the disk pressing parts 16b and 16c, the disk 101 is separated from the disk holding portions 33.

In this condition, the first slider 27 is moved in the direction C. The pin 73 of the first slider 27 is brought into contact with the slanted portion 32a of the disk holder 32. In FIG. 20, the central hole of the disk 101 is indicated by reference numeral 101a.

Figure 21:
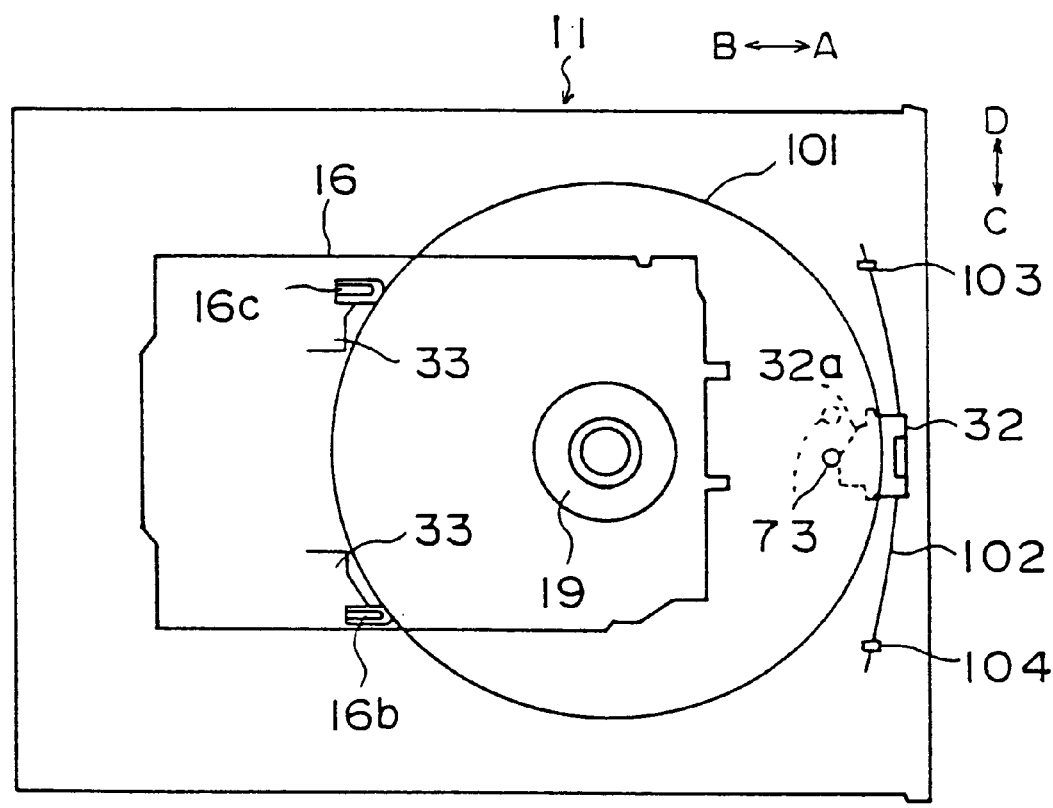
FIG. 21 is a side view illustrating a condition of the disk apparatus in which the tray is moved to the disk-loaded position in the case of the vertical position installation.
Figure 22:
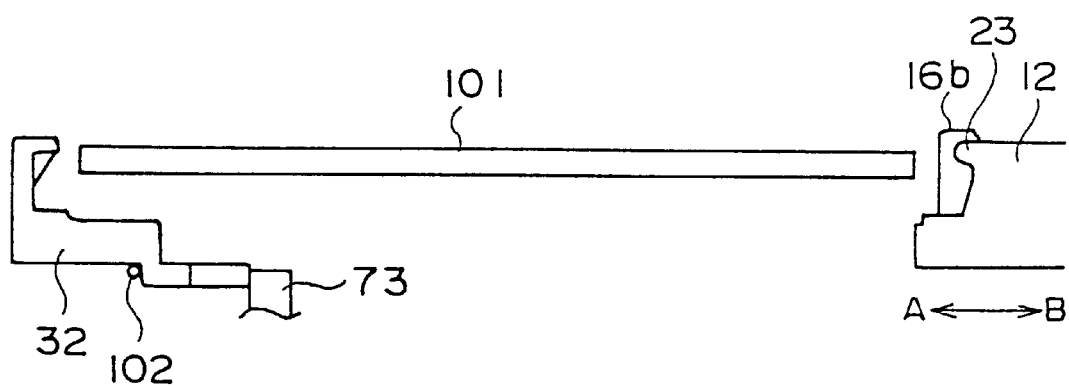
FIG. 22 is a top view illustrating the condition of the disk apparatus shown in FIG. 21.

FIG. 21 is a side view illustrating a condition of the disk apparatus 11 in which the tray 12 is moved to the disk-loaded position in the case in which the disk apparatus 11 is installed in the vertical position. FIG. 22 is a top view illustrating the condition of the disk apparatus shown in FIG. 21. The condition of the disk apparatus 11 corresponds to a position that is indicated by reference numeral Q3 in FIG. 16.

As shown in FIG. 21 and FIG. 22, the tray 12 is further moved in the direction B to the disk-loaded position. In this condition, while the first slider 27 is moved in the direction C, the pin 73 of the first slider 27 presses the slanted portion 32a of the disk holder 32 in the direction A. The disk holder 32 is moved back in the direction A by the pin 73 against the actuating force of the spring member 102, and the disk holder 32 is separated from the periphery of the disk 101 at the front end by the movement of the first slider 27. At the same time, the front end of the movable base 16 is actuated to the lifted position, so that the turntable 19 and the pickup 21 on the movable base 16 are moved so as to confront the disk 101. Hence, the disk 101 is clamped between the damper 18 and the turntable 19 on the movable base 16. In this condition, the disk 101 can be rotated on the turntable 19 to read information from the disk by using the pickup 21.

The central hole 110a of the disk 101 is easily fitted into the tapered portion of the turntable 19, and the damper 18 is fitted onto the disk 101 on the turntable 19. By the connection of the central hole 101a and the tapered portion of the turntable 19, the disk 101 is moved relative to the chassis 13 in the direction A about 1 millimeter. By this movement, the disk 101 in its vertical position can be separated from the disk pressing parts 16b and 16c, and the disk 101 is clamped between the damper 18 and the turntable 19 on the movable base 16.

In this condition, the disk 101 can be rotated on the turntable 19 to read information from the disk by using the pickup 21. The disk 101 does not fall down from the tray 12. The disk holder 32 reliably holds the disk 101 by pushing the disk 101 in the radial direction by the actuating force of the spring member 102. It is not necessary to push the surface of the disk 101 by a relatively large actuating force in the direction perpendicular to the surface of the disk 101 as in the conventional disk apparatus. Further, it is possible to easily separate the front end of the disk 101 from the disk holder 32 by using a relatively small force to actuate the movement of the disk holder 32. The load of the motor 106 required to lower the first slider 27 can be reduced.

In the disk apparatus 11 of the present embodiment, when installed in the vertical position, it is possible to provide an increased reliability of the disk clamping operation and a simple construction of the movable base drive unit 26.

Figure 23:
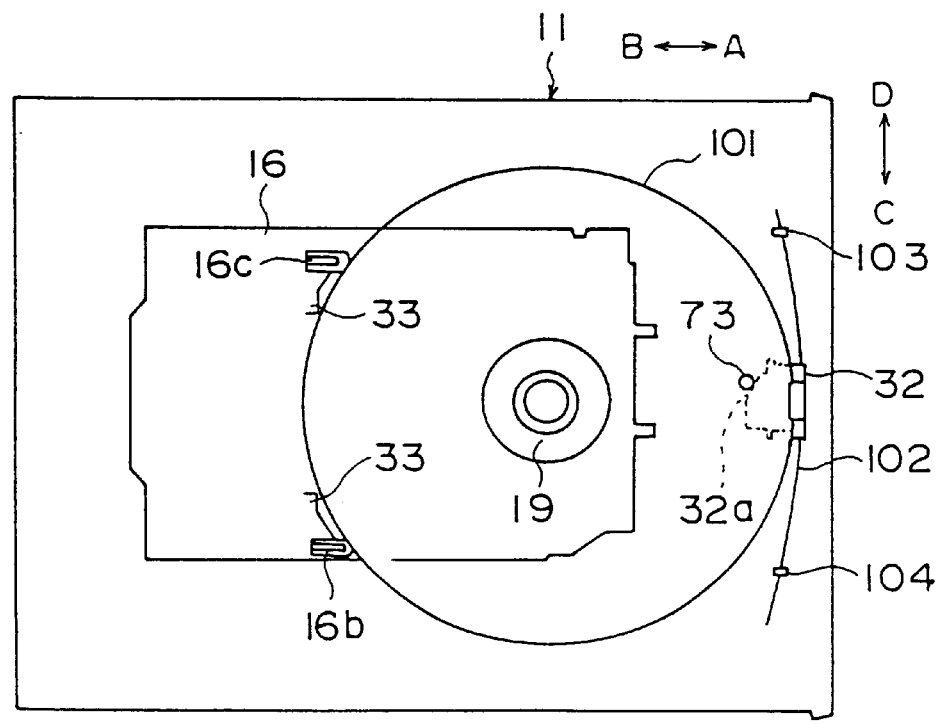
FIG. 23 is a side view illustrating a condition of the disk apparatus in which the disk is being unloaded in the case of the vertical position installation.
Figure 24:
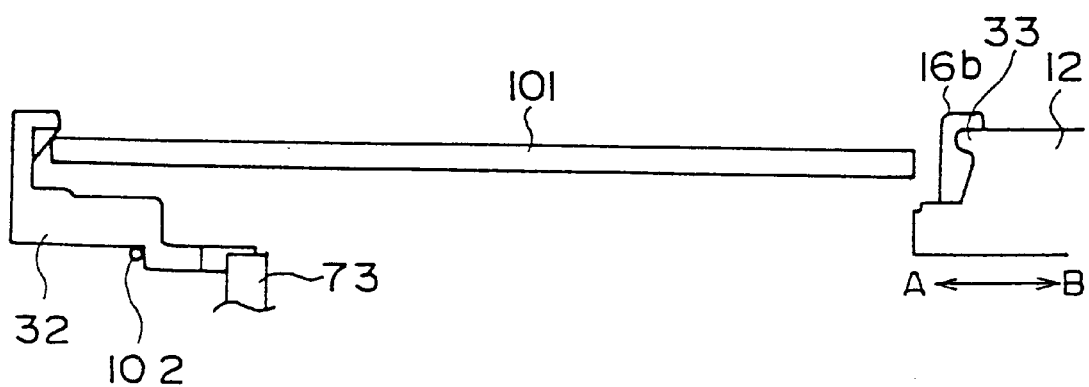
FIG. 24 is a top view illustrating the condition of the disk apparatus shown in FIG. 23.
Figure 25:
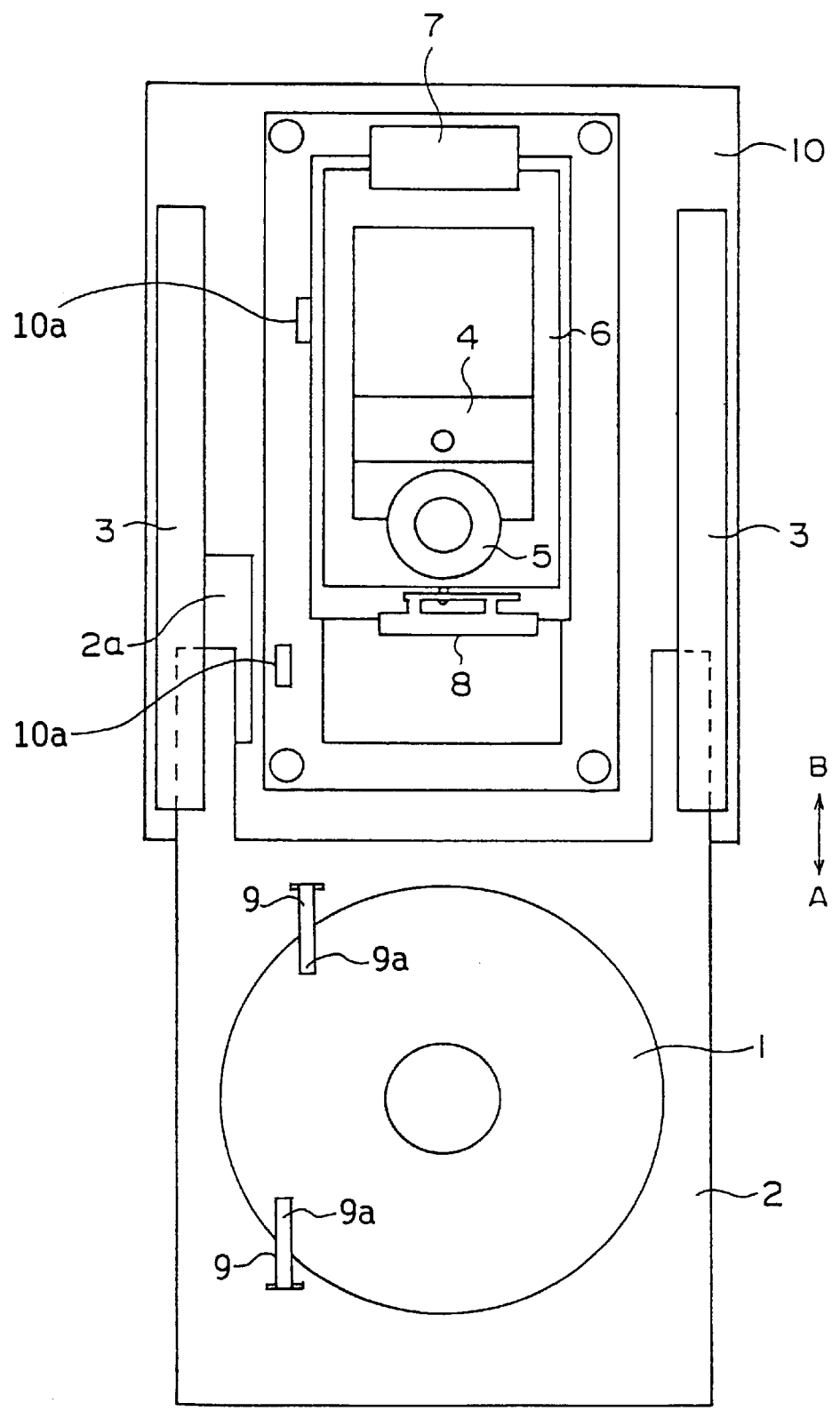
FIG. 25 is a top view of a conventional disk apparatus.

FIG. 23 is a side view illustrating a condition of the disk apparatus 11 in which the disk 101 is being unloaded in the case in which the disk apparatus 11 is installed in the vertical position. FIG. 24 is a top view illustrating the condition of the disk apparatus 11 shown in FIG. 23. The condition of the disk apparatus 11 corresponds to a position that is indicated by reference numeral Q4 in FIG. 16.

As shown in FIG. 23 and FIG. 24, when the disk 101 is intended to be unloaded from the disk apparatus 11, the reverse rotation of the motor 106 is performed, and the first slider 27 is moved in the direction D through the engagement of the rack 71 and the gear 29 with the driving force of the motor 106. The movable base 16 is moved in the direction to separate the movable base 16 from the disk 101. The turntable 19 is moved together with the movement of the movable base 16. The clamper 18 is loosely fitted in the central hole of the clamper holder 17, and the clamper 18 and the disk 101 are moved relative to the turntable 19 about 1 millimeter so as to be separated from the turntable 19.

The pin 73 of the first slider 27 is shifted in the direction D, and the disk holder 32 is moved in the direction B by the actuating force of the 102. The disk holder 32 reliably holds the disk 101 by pressing the disk 101 in the radial direction by the actuating force of the spring member 102, so as to inhibit the movement of the disk 101 in the direction perpendicular to the surface of the disk 101.

After the disk 101 is unloaded and the movable base 16 is actuated to the lowered position, the disk 101 is held on the disk placing surface 30 of the tray 12 by both the disk holder 32 and the disk holding portions 33 in a similar manner to the condition of FIG. 19. The spring member 102 exerts the actuating force on the disk 101 through the disk holder 32 so as to push the periphery of the disk 101 in the radial direction of the disk 101. In this condition, the disk 101 in the vertical position is reliably held on the tray 12. When the tray 12 is pulled out of the chassis 13, the disk 101 can easily be taken out of the disk apparatus 11.

In the above-described embodiment, the present invention is applied to the CD-ROM drive for the sake of exemplary illustration. However, the present invention is not limited to the above-described embodiment, and variations and modifications may be made without departing from the scope of the present invention. It is a matter of course that the present invention is applicable to a disk apparatus having a disk loading mechanism in which a recording medium, different from the CD-ROM, is held on a tray and the tray is movable between a disk-change position and a disk-loaded position.

The present invention is based on Japanese priority application No. 9-194223, filed on Jul. 18, 1997, the entire contents of which are hereby incorporated by reference.

What is claimed is:

1. A disk apparatus comprising:
   a chassis;
   a tray supported on the chassis and provided to be movable between a disk-change position and a disk-loaded position;
   a disk holder for holding a disk on the tray, the disk holder being movably supported at an end of the tray such that the disk holder is movable relative to the tray in a first radial direction of the disc toward the disk and in a second radial direction of the disc away from the disc;
   a movable base on which a turntable is supported, the turntable provided to support and rotate the disk on the turntable, the movable base provided to be vertically rotatable between a lowered position and a lifted position;
   a damper for clamping the disk between the turntable and the clamper; and
   a movable base drive unit for actuating the movable base to the lifted position by a driving force of a motor when the tray is moved to the disk-loaded position, such that the disk is clamped between the damper and the turntable,
   the movable base drive unit comprising a first slider provided to be movable in a transverse direction of the tray, said first slider actuating the movable base to the lifted position and pressing the disk holder in said second radial direction of the disk to separate the disk holder from the disk on the tray.

2. The disk apparatus according to claim 1, wherein the tray includes disk holding portions at rear positions of a disk placing surface, the disk holding portions holding a periphery of the disk at the rear positions.

3. The disk apparatus according to claim 1, wherein the disk holder is provided at a front end of the tray such that the disk holder is movable in a radial direction of the disk.

4. The disk apparatus according to claim 1, wherein the disk holder includes a spring member, the spring member being provided on the tray and exerting an actuating force on the disk holder so as to press a periphery of the disk in a radial direction of the disk such that the disk is held on the tray.

5. The disk apparatus according to claim 1, wherein the tray includes disk holding portions at rear positions of a disk placing surface, the disk holding portions holding a periphery of the disk at the rear positions, the disk holder being provided at a front end of the tray and confronting the disk holding portions such that the disk holder is movable in a radial direction of the disk, the disk holder including a spring member, the spring member being provided on the tray and exerting an actuating force on the disk holder so as to press a periphery of the disk in a radial direction of the disk such that the disk is held on the tray.

6. The disk apparatus according to claim 1, wherein the movable base includes disk pressing parts provided at side portions of the movable base, the disk pressing parts contacting a periphery of the disk on the tray when the tray is moved to the disk-loaded position.

7. The disk apparatus according to claim 1, wherein the movable base drive unit further includes an emergency arm provided to be rotatable in one of a clockwise direction and a counter-clockwise direction in accordance with a movement of the first slider.

8. The disk apparatus according to claim 1, wherein the first and second radial directions in which the disk holder is movable relative to the tray are parallel to a surface of the disk on the tray, and the first slider presses the disk holder in the second radial direction so that the disk holder is moved to a position wherein the disk holder is separated from the disk.

9. The disk apparatus according to claim 1, wherein the first slider of the movable base drive unit actuates the movable base to the lifted position when the tray is moved from the disk-change position to the disk-loaded position and substantially at the same time, presses the disk holder in the second radial direction by contact with the disk holder so as to separate the disk holder from the disk.

10. The disk apparatus according to claim 1, wherein the first slider of the movable base drive unit presses the disk holder in the second radial direction by contact with the disk holder so as to separate the disk holder from the disk, after the tray is moved to the disk-loaded position and the movable base is actuated to the lifted position.

11. A disk apparatus comprising:

a chassis;

a tray supported on the chassis and provided to be movable between a disk-change position and a disk-loaded position;

a disk holder for holding a disk on the tray at a given position;

a movable base on which a turntable is supported, the turntable provided to support and rotate the disk on the turntable, the movable base provided to be vertically rotatable between a lowered position and a lifted position;

a clamper for clamping the disk between the turntable and the clamper; and a movable base drive unit for actuating the movable base to the lifted position by a driving force of a motor when the tray is moved to the disk-loaded position, such that the disk is clamped between the damper and the turntable, the movable base drive unit including a first slider which actuates the movable base to the lifted position and presses the disk holder in a radial direction of the disk to separate the disk holder from the disk at the same time as the actuation of the movable base, wherein the movable base drive unit further includes a second slider provided to be movable in one of transverse directions of the tray.

* * * * *